(12) United States Patent
Sakai et al.

(10) Patent No.: US 7,917,500 B2
(45) Date of Patent: Mar. 29, 2011

(54) SYSTEM FOR AND METHOD OF SEARCHING STRUCTURED DOCUMENTS USING INDEXES

(75) Inventors: Miyuki Sakai, Fuchu (JP); Koji Matsui, Fuchu (JP); Motoki Nakanishi, Fuchu (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 424 days.

(21) Appl. No.: 12/046,029

(22) Filed: Mar. 11, 2008

(65) Prior Publication Data

US 2008/0235252 A1    Sep. 25, 2008

(30) Foreign Application Priority Data

Mar. 20, 2007   (JP) ................. 2007-073611

(51) Int. Cl.
  *G06F 7/00*        (2006.01)
  *G06F 17/30*       (2006.01)
(52) U.S. Cl. ..................................... 707/715
(58) Field of Classification Search .............. None
  See application file for complete search history.

(56) References Cited

FOREIGN PATENT DOCUMENTS

| JP | 2006-18584 | 1/2006 |
|----|------------|--------|
| JP | 2006-185408 | 7/2006 |

OTHER PUBLICATIONS

Notification of Reasons for Rejection mailed Dec. 9, 2008 from the Japanese Patent Office for Japanese Patent Application No. 2007-073611.
Kanesmasa et al., "Storage Management of a XML Query Processing System x*Ques*," vol. 99, No. 61, pp. 243-248, Jul. 23, 1999.
Clark et al., "XML Path Language (XPath) Version 1.0," World Wide Web Consortium, Nov. 16, 1999.
Notification of Reasons for Rejection mailed Dec. 9, 2008 from the Japanese Patent Office for Japanese Patent Application No. 2007-073611.
Kanesmasa et al., "Storage Management of a XML Query Processing System x*Ques*," vol. 99, No. 61, pp. 243-248, Jul. 23, 1999.
Clark et al., "XML Path Language (XPath) Version 1.0," World Wide Web Consortium, Nov. 16, 1999.

*Primary Examiner* — Kavita Padmanabhan
(74) *Attorney, Agent, or Firm* — Finnegan, Henderson, Farabow, Garrett & Dunner, L.L.P.

(57) ABSTRACT

A structured document search system comprises an index storage unit and a search unit. The index storage unit stores indexes caused to correspond to the nodes included in the structured documents stored in a database. The indexes include node information items about the nodes to which the indexes are caused to correspond and position information items about related nodes. The node information items include position information items about the nodes to which the indexes are caused to correspond. The search unit, when the search condition specified in the search request made by the client includes value search conditions covering the values of nodes and is a specific search condition specifying a search of a related node common to the nodes, searches the index storage unit for indexes complying with the value search conditions and acquires a position information item about a related node common to the indexes searched for.

7 Claims, 20 Drawing Sheets

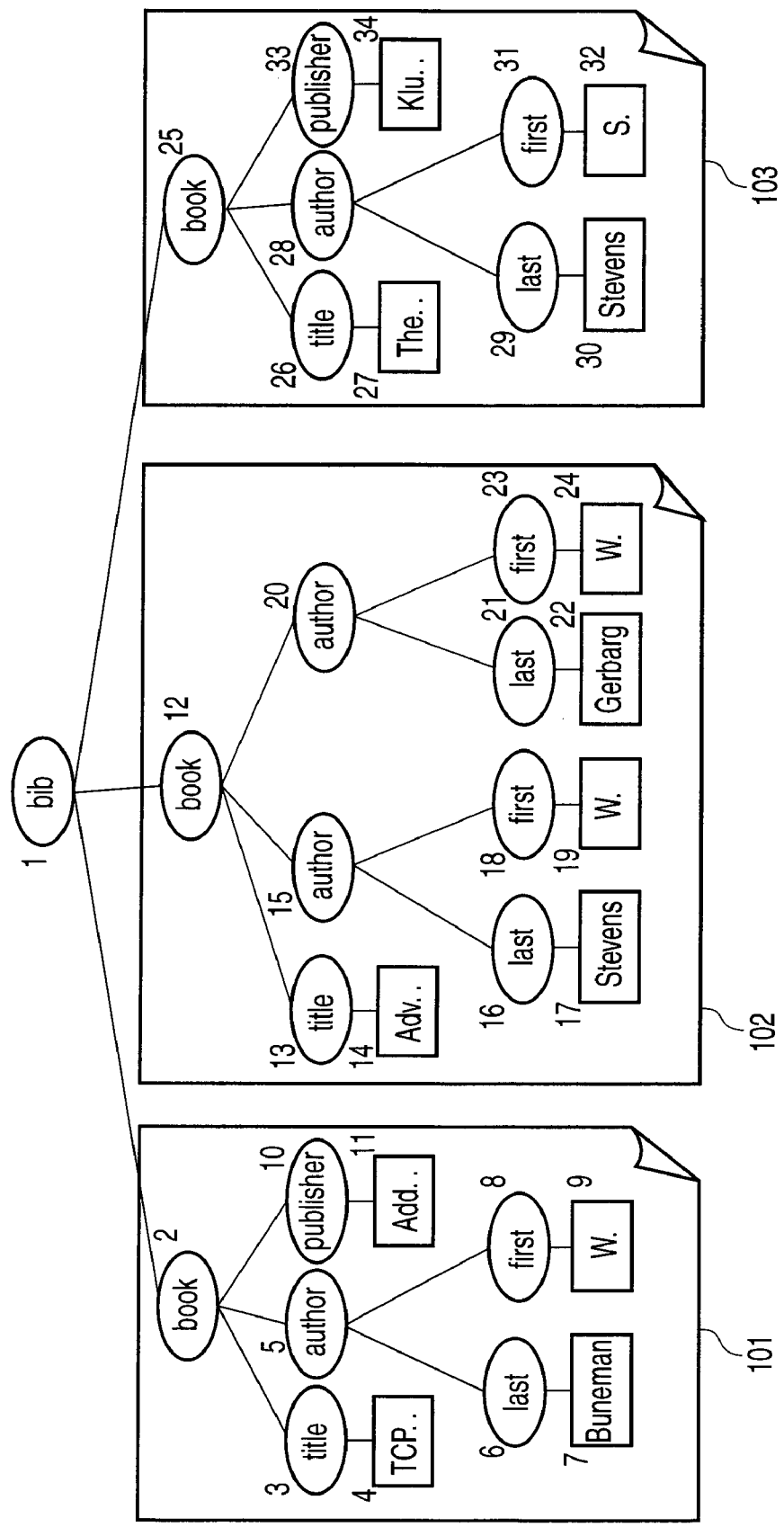
F I G. 2

| Path | Related mode type |
|---|---|
| / bib / book / author / last | Parent |
| / bib / book / author / first | Parent |
| | |

FIG. 4

| Value of node | Node ID | Related node ID |
|---|---|---|
| Buneman | 6 | 5 |
| Stevens | 16 | 15 |
| | 29 | 28 |
| Gerbarg | 21 | 20 |
| W. | 8 | 5 |
| | 18 | 15 |
| | 23 | 20 |
| S. | 31 | 28 |
| | | |

FIG. 5

| Path | Node ID |
|---|---|
| / | 0 |
| / bib | 1 |
| / bib / book | 2 |
| | 12 |
| | 25 |
| / bib / book / title | 3 |
| | 13 |
| | 26 |
| / bib / book / author / last | 6 |
| | 16 |
| | 21 |
| | 29 |
| / bib / book / author / first | 8 |
| | 18 |
| | 23 |
| | 31 |

F I G. 6

| Value of node | Node ID | Related node ID | |
|---|---|---|---|
| Stevens | 16 | 15 | ~111 |
|  | 29 | 28 | |

FIG. 10A

| Value of node | Node ID | Related node ID | |
|---|---|---|---|
| W. | 8 | 5 | ~112 |
|  | 18 | 15 | |
|  | 23 | 20 | |

FIG. 10B

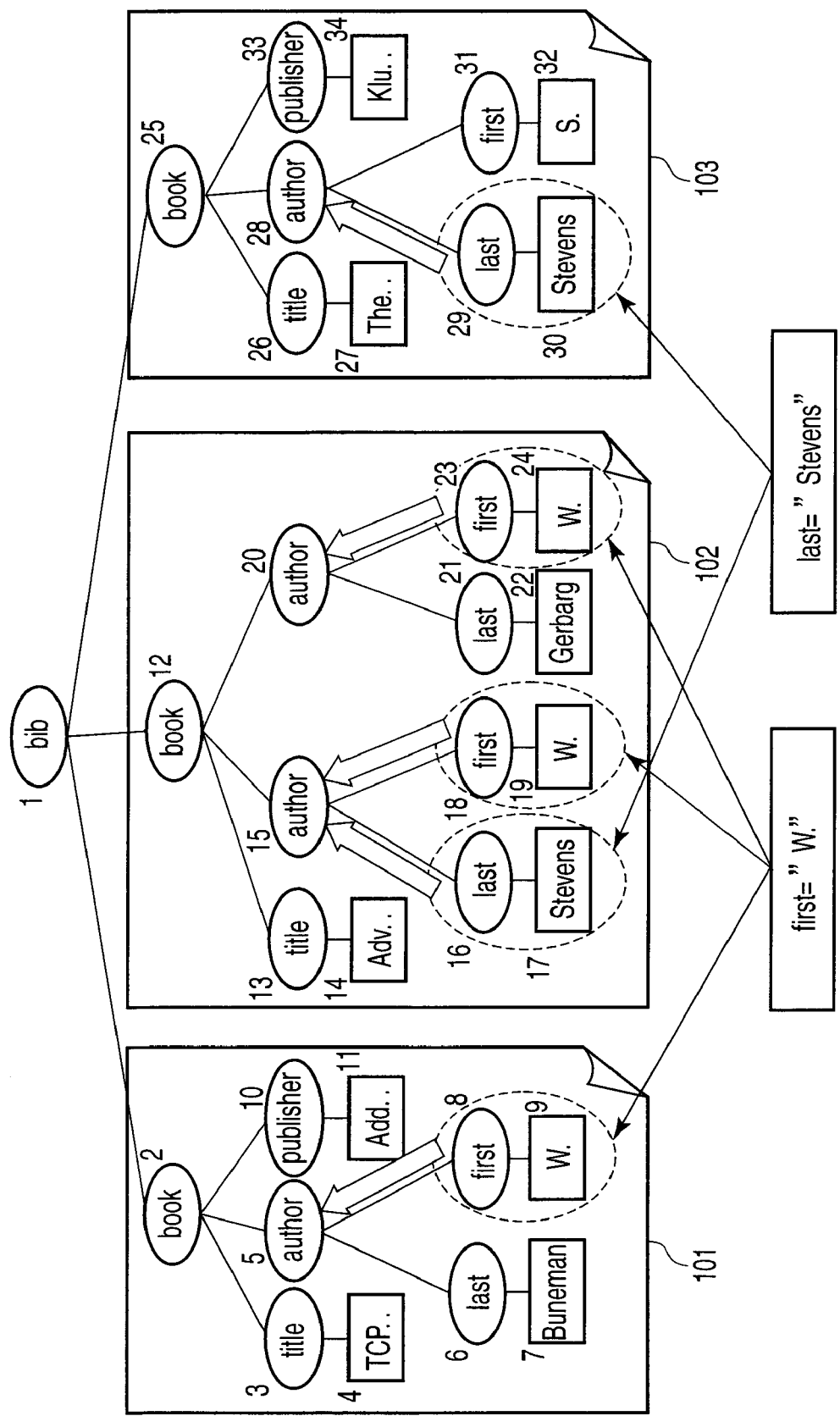
F I G. 11

FIG. 12A

| Path | Node ID | |
|---|---|---|
| / bib / book / author / last | 6 | 113 |
| | 16 | |
| | 21 | |
| | 29 | |

FIG. 12B

| Path | Node ID | |
|---|---|---|
| / bib / book / author / first | 8 | 114 |
| | 18 | |
| | 23 | |
| | 31 | |

FIG. 13A

| Value of node | Node ID | Related node ID | |
|---|---|---|---|
| Stevens | 16 | 15 | 115 |
| | 29 | 28 | |

FIG. 13B

| Value of node | Node ID | Related node ID | |
|---|---|---|---|
| W. | 8 | 5 | 116 |
| | 18 | 15 | |
| | 23 | 20 | |

| Value of node | Node ID | Value of node | Node ID | Related node ID | |
|---|---|---|---|---|---|
| Stevens | 16 | W. | 18 | 15 | 117 |

FIG. 14

| Value of node | Node ID |
|---|---|
| Buneman | 6 |
| Stevens | 16 |
| | 29 |
| Gerbarg | 21 |
| W. | 8 |
| | 18 |
| | 23 |
| S. | 31 |

| Path | Node ID | Related node ID |
|---|---|---|
| / | 0 | Nothing |
| / bib | 1 | 0 |
| / bib / book | 2 | 1 |
| | 12 | 1 |
| | 25 | 1 |
| / bib / book / title | 3 | 2 |
| | 13 | 12 |
| | 26 | 25 |
| / bib / book / author / last | 6 | 5 |
| | 16 | 15 |
| | 21 | 20 |
| | 29 | 28 |
| / bib / book / author / first | 8 | 5 |
| | 18 | 15 |
| | 23 | 20 |
| | 31 | 28 |

| Value of node | Node ID |
|---|---|
| Stevens | 16 |
| | 29 |

| Value of node | Node ID |
|---|---|
| W. | 8 |
| | 18 |
| | 23 |

112a

| Path | Node ID | Related node ID |
|---|---|---|
| /bib/book/author/last | 6 | 5 |
| | 16 | 15 |
| | 21 | 20 |
| | 29 | 28 |

| Path | Node ID | Related node ID |
|---|---|---|
| /bib/book/author/first | 8 | 5 |
| | 18 | 15 |
| | 23 | 20 |
| | 31 | 28 |

| Value of node | Node ID |
|---|---|
| TCP.. | 3 |
| Adv.. | 13 |
| The.. | 26 |

FIG. 22A
(PRIOR ART)

| Value of node | Node ID |
|---|---|
| Buneman | 6 |
| Stevens | 16 |
| Stevens | 29 |
| Gerbarg | 21 |

FIG. 22B
(PRIOR ART)

| Value of node | Node ID |
|---|---|
| W. | 8 |
| W. | 18 |
| W. | 23 |
| S. | 31 |

FIG. 22C
(PRIOR ART)

SYSTEM FOR AND METHOD OF SEARCHING STRUCTURED DOCUMENTS USING INDEXES

CROSS-REFERENCE TO RELATED APPLICATIONS

This application is based upon and claims the benefit of priority from prior Japanese Patent Application No. 2007-073611, filed Mar. 20, 2007, the entire contents of which are incorporated herein by reference.

BACKGROUND OF THE INVENTION

1. Field of the Invention

This invention relates to a system for and method of searching structured documents stored in a database using indexes, and more particularly to a structured document search system and method suitable for a case where a value search covering the values of a plurality of nodes and a search of a related node common to the plurality of nodes are specified depending on a search condition.

2. Description of the Related Art

A document having a logical structure is termed a structured document. In a structured document, the logical structure of the document is indicated by tags written in the document. A structured document whose logical structure is represented using the tags is suitable for processing on a computer.

Extensible Markup Language (XML) is widely as a means for describing data using tags. XML is characterized in hierarchy of data using meaningful tags and in free extensibility of structure. As XML-applied technology putting these features to good use, a database called an XML database (XMLDB) is known. The XML database is controlled by a database management system called an XML database management system (XMLDBMS). The XML database provides the function of storing XML documents and searching for an XML document (a structure specified in the XML document).

The XML document, which is a document written using XML, is known as a representative of structured documents. An XML document is composed of elements constituting a tree structure. Each of the elements, which is also called a node (or tag node), is composed of a tag and a content (or value). The tree structure begins with an element serving as a root (a root node). The individual elements are configured in such a manner that they have a parent-child relationship and a brother-sister relationship.

A standardized query language is frequently used in searching for nodes in an XML document. XPath and XQuery are known as typical query languages. XPath is used to do a search by specifying the positions of elements (or nodes) in the XML document.

In an XML document search system (or a structured document search system) including an XML database management system, to speed up a search, indexes are caused to correspond to nodes regarded as possible targets of a value search (refer to paragraph 0013 of Jpn. Pat. Appln. KOKAI Publication No. 2006-018584, for example). Such indexes are called value indexes.

FIG. 2 shows an example of XML documents in tree structure form. In a database (XML database) in which the XML documents of FIG. 2 have been stored, suppose a book satisfying the condition that title is "TCP . . . " is searched for. In this case, a query made by a client (a client terminal) (hereinafter, referred to as a first query) is described in, for example, XPath, this gives the following:

/bib/book[title="TCP . . . "]

To speed up a search on the basis of a first query (XPath), value indexes are caused to correspond to title nodes regarded as possible targets of a value search. The value indexes are composed of sets of values (keys), such as "TCP . . . " and "Adv . . . ," and node IDs. A node ID, which is a unique number allocated to each node, indicates a logical location (node position) in an XML document stored in the database.

FIGS. 22A to 22C show examples of value indexes. FIG. 22A shows an example of value indexes of nodes (title nodes) having values of title names. FIG. 22B shows an example of value indexes of nodes (last nodes) having values of last names. FIG. 22C shows an example of value indexes of nodes (first nodes) having values of first names. These value indexes are generally held in a value index table.

In a search on the basis of a query from the client to the XML document search system, an index is searched for using the value of a node (element) as a key. If the corresponding index is found, a node ID corresponding to the value can be obtained. In the example of the first query (XPath), the XML document search system can determine from the value index caused to correspond to the title node that there is a node satisfying the condition that title is "TCP . . . " and the node ID is 3 (see FIG. 22A).

As described above, the XML document search system which uses an index (value index) in a search has the following advantages. First, the XML document search system can determine whether there is a node conforming to the condition of the query without searching all of the XML documents (or scrutinizing the XML documents) stored in the database. If there is such a node, the XML document search system can determine the position of the node. This enables the XML document search system to carry out a search at high speed.

To speed up a search when structural conditions are specified, a method of extracting structural information on the XML documents stored in the database and compiling an index is known. Such an index is known as a structure index. The structure index is composed of a set of a path character string indicating a structure, such as "/" or "/bib," and the node ID of a node having the structure. If there are a plurality of nodes conforming to the same path character string (e.g., "/bit/book" in the example of FIG. 2), the plurality of node IDs correspond to the same path character string. The data structure of such a structure index is the same as a structure index applied to an embodiment of the invention explained later. Thus, refer to FIG. 6, if necessary.

In the first query (XPath), the XML document search system finds one node (a node whose node ID is 3) conforming to the condition of the value search on the basis of a value index. It cannot be determined from only the value index whether the node complies with the structural condition (/bib/book/title) given in XPath. Thus, using the structure index, the XML document search system checks whether the node complies with the structural condition. From the structure indexes (structure index table) of FIG. 6, it is seen that there are nodes complying with the structural condition (/bib/book/title) (i.e., three nodes having a structure represented by "/bib/book/title") and the node IDs of the nodes are 3, 13, and 26. The node whose node ID is 3 satisfies both the structural condition and the value search condition. Therefore, it can be determined that the node whose node ID is 3 fulfills all of the search conditions.

As described above, the XML document search system using a value index and a structure index in a search has the following advantages. First, the XML document search system can determine whether there is a node conforming to the conditions of the query including the structural condition without searching all the XML documents stored in the database. If there is such a node, the XML document search system can determine the position of the node. This makes it possible to carry out a search at high speed.

However, in the above conventional techniques, when a query in which a plurality of targets of value search have been specified is processed, this might delay the search. The reason is that the process of searching all of the XML documents (scrutinizing the XML documents) stored in the database is needed. An example of a query in which a plurality of targets of value search have been specified is a query in which a plurality of nodes (tag nodes) acting as the targets of value search are specified by the AND operator "and." When a plurality of nodes are searched for under the condition including the AND operator "and," this might delay the search for the above reason.

Hereinafter, such a search will be explained using a case where an author who satisfies the condition that the value (last name) of a last node is "Stevens" (last="Stevens") and the value (first name) of a first node is "W." (first="W.") is searched for on the basis of the following second query (xPath):

/bib/book/author[last="Stevens" and first="W."]

As described above, value indexes are caused to correspond to nodes regarded as possible targets of a search. The value indexes are composed of sets of a value (key), such as "Stevens" or "Buneman," and a node ID. In the case of a second query, as shown in FIGS. 22B and 22C, assigning a value index to each of (i) the last nodes and (ii) the first nodes makes it possible to search at high speed for nodes which satisfy the condition that the last name is "Stevens" (last="Stevens") and nodes which satisfy the condition that the first name is "W." (first="W.").

However, the search condition shown in the second query is the AND condition that "author who is [A] and [B]." Therefore, of the last nodes and first nodes searched for on the basis of the value index, a node having the same parent node (author node), that is, a node linked with the same node (author node), has to be selected. However, such a link cannot be determined from the value index. Accordingly, in the conventional techniques, all of the XML documents stored in the database have to be actually searched from the last nodes and first nodes searched for, causing a delay in the search.

In the conventional techniques, such a delay is caused as described below even in a search using a structure index. The node IDs of the last nodes searched for from the value index on the basis of the second query, that is, the node IDs of nodes satisfying the condition of the value search that the last name is "Stevens" (last="Stevens") are 16 and 29 (see FIG. 22(b). Moreover, the node IDs of the first nodes searched for from the value index, that is, the node IDs of nodes satisfying the condition of the value search that the first name is "W." (first="W.") are 8, 18 and 23. (See FIG. 22(c).)

When a set (candidate set) of node IDs of the last nodes and a set (candidate set) of node IDs of the first nodes have been acquired, it is determined from the structure index whether, for example, the node IDs included in the two candidate sets satisfy the structural condition (/bib/book/author/last for the last nodes and /bib/book/author/first for the first nodes). In this example, it is seen that all of the node IDs fulfill the structural condition.

Next, of all of the combinations of the last nodes and first nodes narrowed down from the index, the combinations having the same parent (author node) have to be selected under the AND condition that an author who is [A] and [B]. In this example, the nodes satisfying the AND condition are only in a combination of the one whose node ID is 16 among the nodes whose last name is "Stevens" (last="Stevens") and the one whose node ID is 18 among the nodes whose first name is "W." (first="W.").

However, it cannot be determined from the value index and structure index whether the last node and first node have the same parent. Accordingly, in the conventional techniques, all of the XML documents stored in the database have to be actually searched, resulting in a delay in the search.

BRIEF SUMMARY OF THE INVENTION

According to an aspect of the invention, there is provided a structured document search system. The structured document search system comprises an index storage unit and a search unit. The index storage unit stores indexes caused to correspond to the nodes included in structured documents stored in a database. The indexes include node information items about the nodes to which the indexes are caused to correspond and position information items about related nodes. The node information items include position information items about the nodes to which the indexes are caused to correspond. The related nodes are nodes of a previously-specified type having a specific relation to the nodes to which the indexes are caused to correspond on a tree structure of the structured documents including the nodes to which the indexes are caused to correspond. The search unit is configured to search the index storage unit for indexes on the basis of a search condition specified in a search request from a client. The search unit, when the search condition includes value search conditions covering the values of a plurality of nodes and is a specific search condition specifying a search of a related node common to said plurality of nodes, searches the index storage unit for indexes complying with the value search conditions and acquires a position information item about a related node common to the indexes searched for from the indexes searched for.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 shows an example of a set of XML documents stored in the database of FIG. 1;

FIG. 4 shows an example of a data structure of the indexing table shown in FIG. 3;

FIG. 5 shows an example of a data structure of the value index table shown in FIG. 3;

FIG. 6 shows an example of a data structure of the structure index table shown in FIG. 3;

FIGS. 10A and 10B show examples of first candidate node lists acquired according to the value search conditions from the value index table having the data structure of FIG. 5;

FIG. 11 shows the positions in the XML document of FIG. 2 of the last nodes whose value is "Stevens" and the first nodes whose value is "W." included in the first candidate node lists of FIGS. 10A and 10B;

FIGS. 12A and 12B show examples of second candidate node lists acquired according to the value search conditions from the structure index table having the data structure of FIG. 6;

FIGS. 13A and 13B show examples of third candidate node lists obtained by merging the candidate lists acquired according to the value search conditions from the value index table and structure index table;

FIG. 14 shows a list of combinations whose related node IDs coincide with one another between the candidate node lists of FIGS. 13A and 13B;

FIG. 16 shows an example of a data structure of the value index table shown in FIG. 15;

FIG. 17 shows an example of a data structure of the structure index table shown in FIG. 15;

FIGS. 20A and 20B show examples of first candidate node lists acquired according to the value search conditions from the value index table having the data structure of FIG. 16;

FIGS. 21A and 21B show examples of second candidate node lists acquired according to the value search conditions from the structure index table having the data structure of FIG. 17; and FIGS. 22A to 22C show examples of value indexes applied to conventional techniques.

DETAILED DESCRIPTION OF THE INVENTION

Hereinafter, referring to the accompanying drawings, an embodiment of the invention will be explained.

Figure 1:
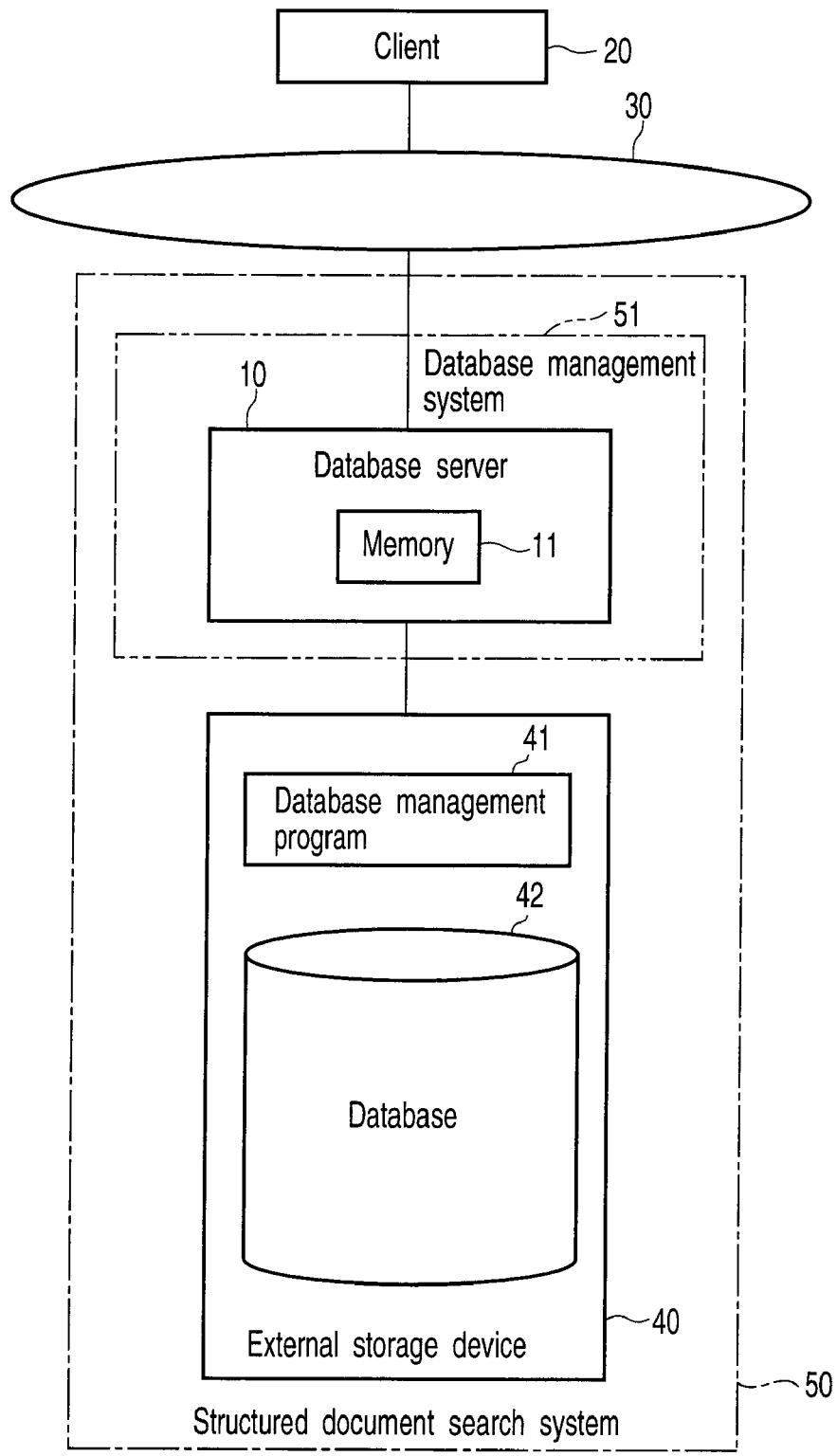
FIG. 1 is a block diagram showing a hardware configuration of a client-server system including a structured document search system according to an embodiment of the invention.

FIG. 1 is a block diagram showing a hardware configuration of a client-server system including a structured document search system 50 according to an embodiment of the invention. The client-server system is mainly composed of a database server 10 and a plurality of clients (client terminals). The plurality of clients include a client 20. On the client 20, an application (application program) using the database server 10 operates. The plurality of clients including the client 20 are connected to the database server 10 via a network 30, such as a local area network (LAN). In FIG. 1, the clients excluding the client 20 are omitted.

The database server 10 is a computer (database server computer) having a memory 11, such as a main memory. The database server 10 is connected to an external storage device 40, such as a hard disk drive. The external storage device 40 stores a database management program 41 and a database 42. In the embodiment, the structured document search system 50 is realized by the database server 10 and external storage device 40 (database 42).

The database management program 41 is used for the management of the database 42 by the database server 10 and a search process on the basis of a query using XPath, XQuery, or the like from a client. The database 42 is an XML document database (structured document database) which stores structured documents, such as XML documents (XML electronic documents).

FIG. 2 shows an example of a set of XML documents stored in the database 42. In the example of FIG. 2, the database 42 stores a set of XML documents, including XML document 101 to XML document 103. Each of the nodes included in the XML documents stored in the database 42 has a node ID indicating the position of the node as in a conventional equivalent. In FIG. 2, a numeral put near each of the nodes indicates the node ID of the node.

Figure 3:
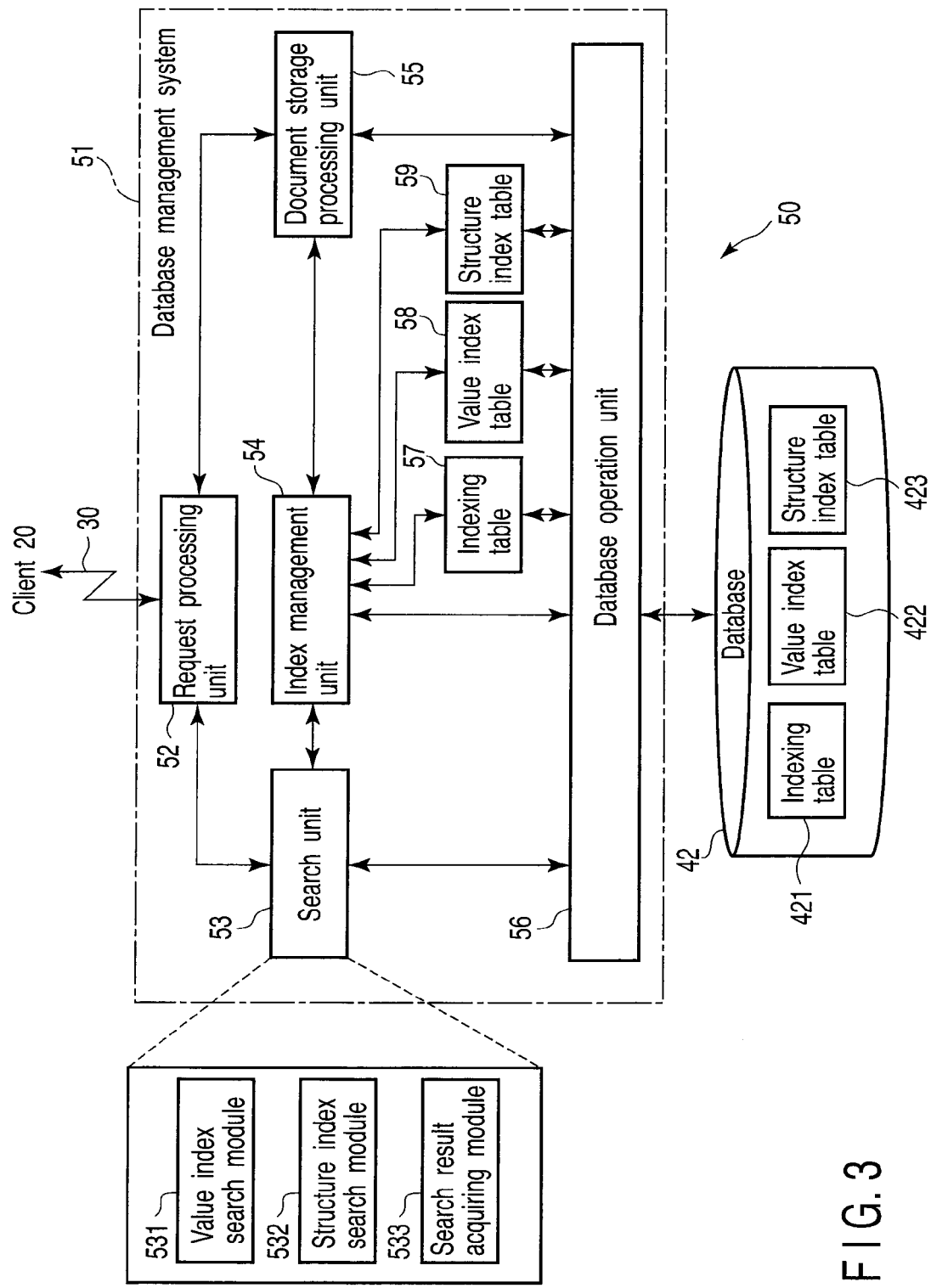
FIG. 3 is a block diagram mainly showing a functional configuration of the structured document search system of FIG. 1.

FIG. 3 is a block diagram mainly showing a functional configuration of the structured document search system 50 of FIG. 1. The structured document search system 50 comprises a database management system 51 and the database 42. The database 42 stores not only a set of XML documents but also an indexing table 421, a value index table 422, and a structure index table 423.

The indexing table 421 is used to manage information (indexing information) about the nodes which are included in the XML documents stored in the database 42 and to which value indexes are to be assigned (set). The value index table 422 holds value indexes (index information items) assigned (caused to correspond) to the nodes (nodes regarded as possible targets of a value search) managed by the indexing table 421. Each of the value indexes includes the value (key) of the node (element), the node ID of the node, and the node ID of a related node (here, a parent node). The structure index table 423 holds structure indexes representing the structures of the nodes included in the XML documents stored in the database 42.

The database management system 51 includes a request processing unit 52, a search unit 53, an index management unit 54, a document storage processing unit 55, a database operation unit 56, an indexing table 57, a value index table 58, and a structure index table 59.

Receiving a request (command) from the client 20, the request processing unit 52 determines the type of the request and, on the basis of the result of the determination, sends the request to the search unit 53, index management unit 54, or document storage processing unit 55. If the request from the client 20 is a search request, the request processing unit 52 sends the search request to the search unit 53. If the request from the client 20 is an indexing request, the request processing unit 52 sends the indexing request to the index management unit 54. If the request from the client 20 is a document storage request, the request processing unit 52 sends the document storage request to the document storage processing unit 55.

Receiving the search request from the client 20 via the request processing unit 52, the search unit 53 performs a search process on the basis of a query included in the search request. In the search process, the index management unit 54 (the value index table 58 and structure index table 59 managed by the index management unit 54) is used. The search unit 53 includes a value index search module 531, a structure index search module 532, and a search result acquiring module 533.

The value index search module 531 searches the value index table 58 for a value index whose value complies with the search condition specified in the search request (query). The structure index search module 532 searches the structure index table 59 for a structure index whose structure conforms to the search condition specified in the search request. The search result acquiring module 533 acquires the search result for the search request on the basis of the result of searching for the index at the value index search module 531 and structure index search module 532.

The index management unit 54 receives the indexing request from the client 20 via the request processing unit 52 and performs an indexing process on the basis of the indexing request. In the indexing process, information on the elements (nodes) in an XML document to which the value indexes specified in the indexing request are to be assigned (set) is added to the indexing table 57. Using the indexing table 57, the index management unit 54 also manages information about the nodes to which value indexes have been assigned (set). The index management unit 54 further generates a list of index information items (value indexes) for the nodes complying with the value search condition on the basis of the value index table 58. When the value search condition includes a structural condition, the index management unit 54 further generates a list of index information items (structure indexes) for the nodes complying with the structural condition on the basis of the structure index table 59. The index management unit 54 generates a list according to the request from the search unit 53 when the search unit 53 performs a value search process. The generated list is sent to the search unit 53.

The document storage processing unit 55 receives the document storage request from the client 20 via the request processing unit 52 and performs a document storage process of storing an XML document specified in the document storage request in the database 42. In the document storage process, the document storage processing unit 55 generates value indexes to be assigned to the ones specified for indexing in the indexing table 57 among the nodes included in XML documents to be stored in the database 42 and adds the value indexes to the value index table 58. The database operation unit 56 functions as an interface which enables the search unit 53, index management unit 54, and document storage processing unit 55 to access the database 42 and performs a process on the database 42.

The indexing table 57, value index table 58, and structure index table 59 correspond to the indexing table 421, value index table 422, and structure index table 423 stored in the database 42, respectively. In the embodiment, at the start-up of the structured document search system 50, the indexing table 421, value index table 422, and structure index table 423 are copied as the indexing table 57, value index table 58, and structure index table 59 from the database 42 to the memory 11 of FIG. 1. When the structured document search system 50 is in operation, the indexing table 57, value index table 58, and structure index table 59 are referred to or updated. The updated contents of the indexing table 57, value index table 58, and structure index table 59 are reflected in the indexing table 421, value index table 422, and structure index table 423 periodically or as needed (e.g., when the load on the system 50 is low).

FIG. 4 shows an example of a data structure of the indexing table 57 shown in FIG. 3. In the embodiment, the indexing table 57 is used as an indexing information storage unit for holding indexing information for each path (path character string). Indexing information includes the path corresponding to the indexing information and related node type information.

The path is an absolute path which represents the structure of a node specified in the path as a path from the root node to the node. Related node type information indicates the type of a node (related node) having a specific relation to the node (specified node) specified in the path caused to correspond to the information on the hierarchy structure (tree structure) of the XML document including the specified node. When the structured document search system 50 is caused to search for a plurality of nodes and a related node common to the plurality of nodes is obtained as the result of the search, the user specifies the type. A related node is a node having a specific relation to the specified node on the hierarchy structure (tree structure) of the XML document including the specified node. For example, a related node is a parent node or a brother node. A related node can be traced back from the specified node on the tree structure of the XML document including the specified node. In the embodiment, to simplify the explanation, suppose the type of related nodes is limited to parent nodes.

FIG. 5 shows an example of a data structure of the value index table 58 shown in FIG. 3. In the embodiment, the value index table 58 is used as a value index storage unit for holding (storing) value indexes (index information items) assigned to the nodes managed using the indexing table 57. Each of the value indexes includes the value of a node, the node ID of the node, and the node ID (related node ID) of a related node related to the node. The value index differs from that in conventional technology in that the related node ID is added. The value index table 58 of FIG. 5 includes the value indexes assigned to the last node and first node in XML document 101 to XML document 103 of FIG. 2.

FIG. 6 shows an example of a data structure of the structure index table 59 shown in FIG. 3. The structure index table 59 is used as a structure index storage unit for holding (storing) structure indexes representing the structures of the nodes included in the XML documents stored in the database 42. As in conventional technology, each of the structure indexes applied in the embodiment includes a path (path character string) representing a structure and the node ID of a node having the structure indicated by the path.

The structure index table 59 of FIG. 6 includes the structure indexes assigned (caused to correspond) to the structures of the individual nodes in XML document 101 to XML document 103 of FIG. 2. When a plurality of node IDs correspond to a single path (path character string), a plurality of node IDs are entered into the structure index table 59 in such a manner that the plurality of node IDs are caused to correspond to the single path. An example of such a case is a case where a plurality of XML documents having the same structure as that of XML document 101 to XML document 103 of FIG. 2 have been stored in the database 42.

In the embodiment, suppose the database server 10 of FIG. 1 reads the database management program 41 stored in the external storage device 40 into the memory 11 of the server 10 and executes the program 41, thereby realizing the units 52 to 56. The program 41 has been stored in a computer-readable storage medium, such as a compact disk or a ROM, and is therefore distributable. Moreover, the program 41 may be downloaded to the database server 10 via the network 30. In addition, the units 52 to 56 may be composed of hardware.

Next, the operation of the structured document search system 50 of FIG. 3 will be explained.

<Indexing Process>

Figure 7:
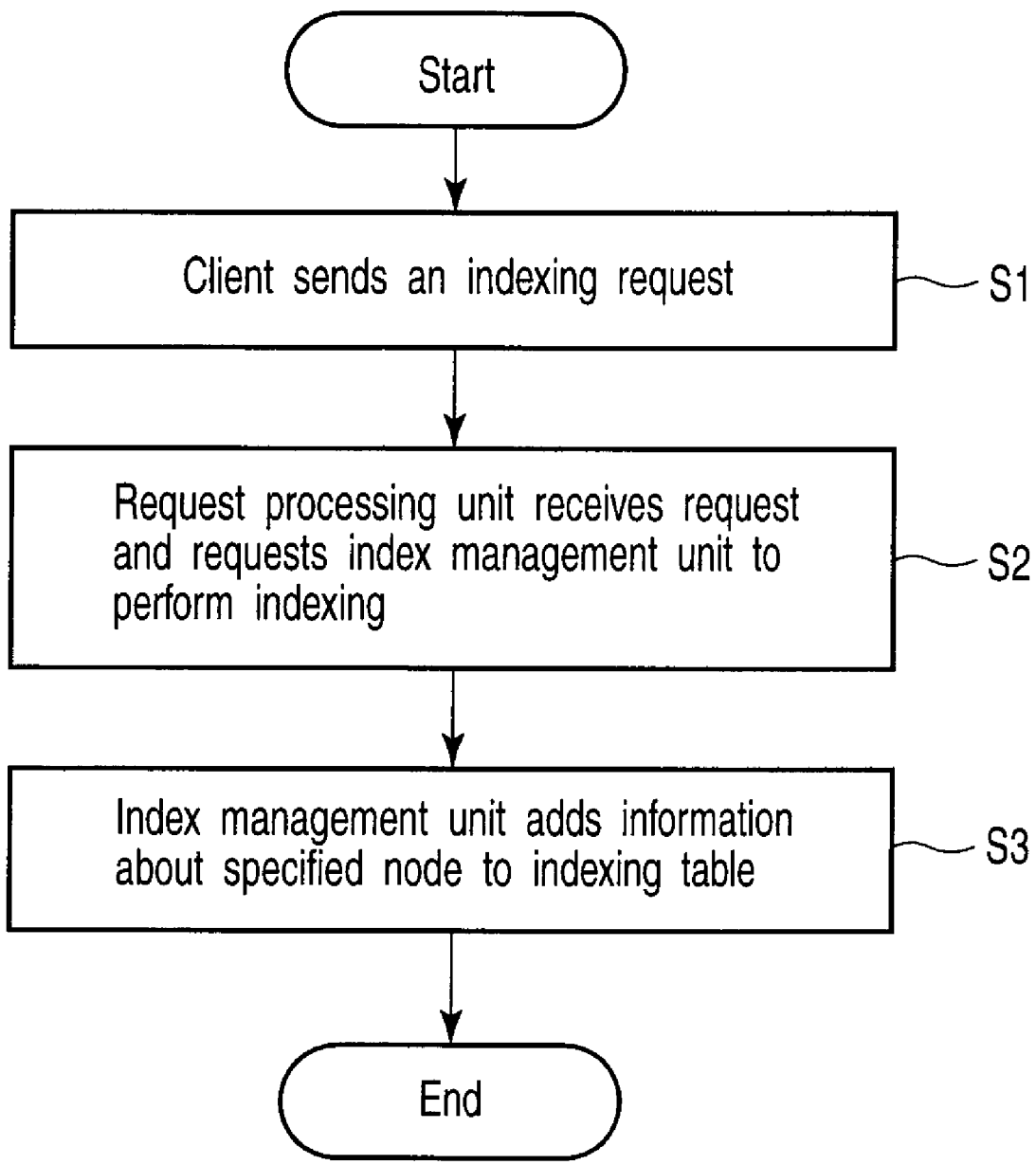
FIG. 7 is a flowchart to help explain the procedure for an indexing process in the embodiment.

An indexing process in the structured document search system 50 will be explained with reference to a flowchart in FIG. 7. Suppose, for example, XML document 101 to XML document 103 having a tree structure as shown in FIG. 2 are shown on the display screen of the client 20. In the example of FIG. 2, the XML documents 101 to 103 are stored in a collection called "bib" corresponding to a folder or directory in a file system and managed there. The top-level nodes in XML document 101 to XML document 103 are book nodes. The parent node of these book nodes is a bib node. In the example of FIG. 2, the bib node is a root node in a tree structure including XML document 101 to XML document 103.

In a state where XML document 101 to XML document 103 having a tree structure as shown in FIG. 2 are shown, suppose the user has specified an arbitrary node as a node whose index is to be generated by operating, for example, the mouse. With the node specified, suppose the user has operated the client 20 to specify indexing. In this case, if a related node has to be specified, the user specifies the type of the desired related node.

Then, according to the instruction from the user, the client 20 sends an indexing request to set (assign) an index to the specified node to the structured document search system 50 via the network 30 (step S1). The indexing request includes a path (absolute path) representing the structure of a node to which the index is to be set and the type of a related node.

Receiving the indexing request from the client 20, the request processing unit 52 of the structured document search system 50 hands the indexing request to the index management unit 54, thereby requesting the index management unit 54 to perform indexing (step S2). Receiving the indexing request from the client 20 via the request processing unit 52, the index management unit 54 adds indexing information about the node specified in the request (that is, the node in which the index is to be set) to the indexing table 57 (step S3). Here, as indexing information about the specified node, information (related node type information) indicating a path representing the structure of the specified node and the type of a node related to the specified node (related node) is added to the indexing table 57.

Accordingly, for example, if the specified node is a node whose node ID is 6 in FIG. 2 and the type of the specified related node is a parent node, indexing information indicating "/bib/book/author/last" as a path (path character string) and also indicating "a parent node" as the type of the related node is added to the table 57 (see FIG. 4). Similarly, if the specified node is a node whose node ID is 8 in FIG. 2 and the type of the specified related node is a parent node, indexing information indicating "/bib/book/author/first" as a path and indicating "a parent node" as the type of the related node is added in the indexing table 57 (see FIG. 4).

<Document Storage Process>

Figure 8:
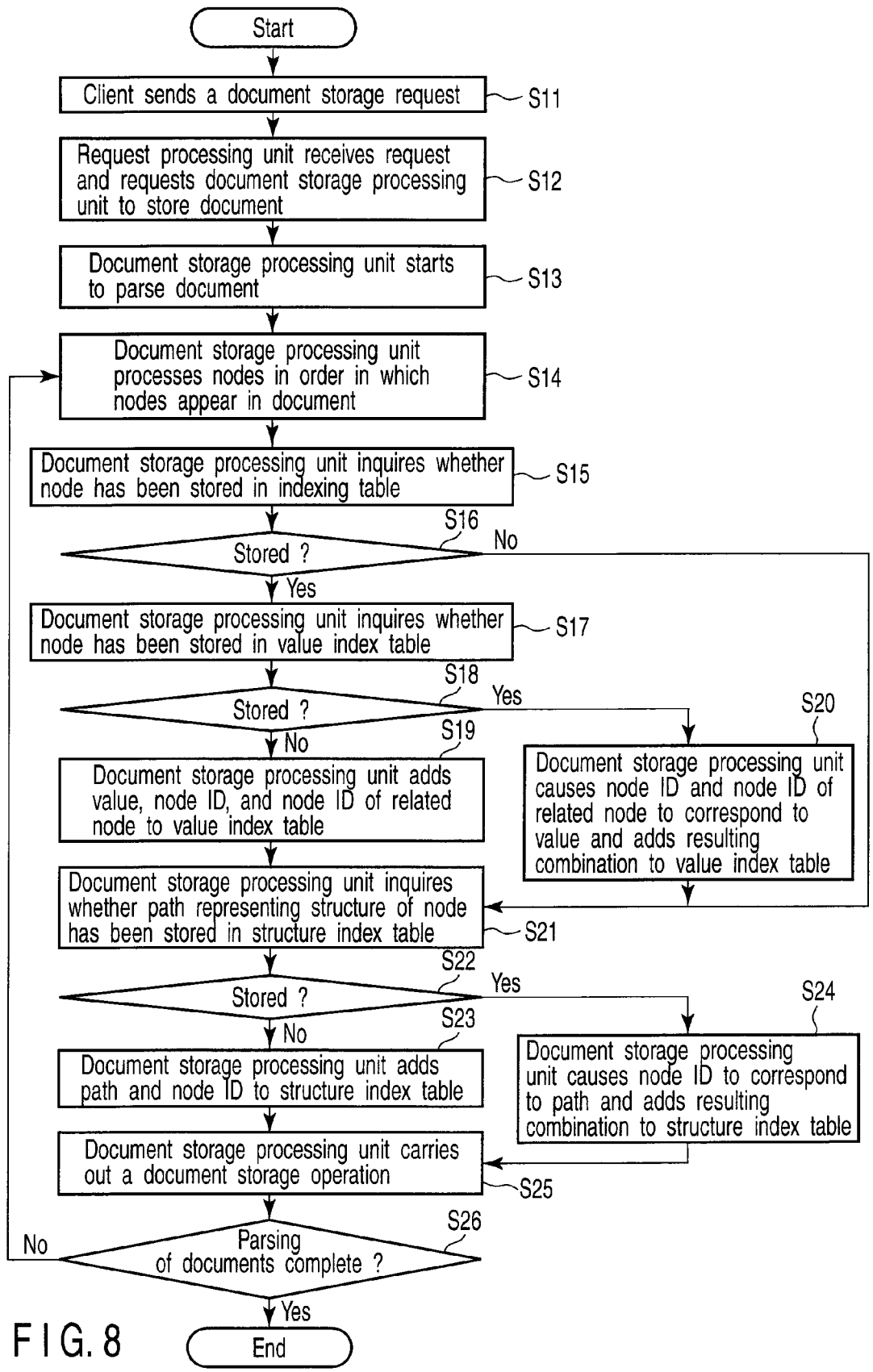
FIG. 8 is a flowchart to help explain the procedure for a document storage process in the embodiment.

Next, a document storage process after indexing will be explained with reference to a flowchart in FIG. 8. Suppose the user has specified an XML document to be stored in the database 42 and operated the client 20 to specify the storing of the XML document. Then, the client 20 sends a document storage request to store the specified XML document in the database 42 to the structured document search system 50 via the network 30 (step S11).

Receiving the document storage request from the client 20, the request processing unit 52 hands the document storage request to the document storage processing unit 55, thereby requesting the document storage processing unit 55 to store the XML document (step S12). Receiving the document storage request from the client 20 via the request processing unit 52, the document storage processing unit 55 starts to parse the XML document specified in the request (step S13). Each time a node is extracted from the XML document as a result of parsing the XML document, the document storage processing unit 55 performs the following process on the node (step S14). The order of nodes extracted from the XML document coincides with the order of nodes appearing in the XML document.

First, the document storage processing unit 55 inquires of the index management unit 54 whether information on the extracted node (in this case, the path representing the structure of the extracted node) has been entered in the indexing table 57 (step S15). Then, the index management unit 54 refers to the indexing table 57 to check whether the path (path character string) representing the structure of the inquired node has been stored in the indexing table 57 and informs the document storage processing unit 55 of the result. If the node has been stored, the index management unit 54 further informs the document storage processing unit 55 of the type of the related node indicated in the related node type information stored in the indexing table 57 in such a manner that the type is cause to correspond to the path representing the structure of the inquired node.

Receiving the notice from the index management unit 54, the document storage processing unit 55 determines whether (a path representing the structure of) the extracted node has been stored in the indexing table 57 (step S16). If it has been stored, the document storage processing unit 55 checks the type of the related node stored in the indexing table 57 so as to correspond to the path representing the structure of the extracted node, on the basis of the notice from the index management unit 54.

Next, the document storage processing unit 55 inquires of the index management unit 54 whether the value of the extracted node has been stored in the value index table 58 (step S17). Then, the index management unit 54 refers to the value index table 58 to check whether the inquired value has been stored in the value index table 58 and informs the document storage processing unit 55 of the result. Receiving the notice from the index management unit 54, the document storage processing unit 55 determines whether the value of the extracted node has been stored in the value index table 58 (step S18).

If the value has not been stored (step S18), the document storage processing unit 55 causes the index management unit 54 to add the value of the extracted node, the node ID of the node, and the node ID of the related node (parent node in this case) of the determined type to the value index table 58 (step S19). Here, if the related node is a parent node as in the embodiment, the related node has already been extracted. This holds true when the related node is, for example, an elder brother node, or a parent node's parent node (i.e., grandparent node). If the related node is, for example, a younger brother node, the document storage processing unit 55 traces back the tree structure and extracts the younger brother node. In contrast, if the value of the extracted node has been stored (step S18), the document storage processing unit 55 causes the node ID of the extracted node and the node ID of the related node (parent node in this case) of the determined type to correspond to the stored value and causes the index management unit 54 to add the result to the value index table 58 (step S20).

After executing step S19 or step S20, the document storage processing unit 55 inquires of the index management unit 54 whether the path (path character string) representing the structure of the extracted node has been stored in the structure index table 59 (step S21). If it has been determined that (the path representing the structure of) the extracted node has not been stored in the indexing table 57 (step S16), the document storage processing unit 55 executes step S21 immediately.

Receiving the query from the document storage processing unit 55, the index management unit 54 refers to the structure index table 59. Then, the index management unit 54 checks whether the path (path character string) representing the structure of the inquired node has been stored in the structure index table 59 and informs the document storage processing unit 55 of the result. Receiving the notice from the index management unit 54, the document storage processing unit 55 determines whether the path representing the structure of the extracted node has been stored in the structure index table 59 (step S22).

If it has not been stored (step S22), the document storage processing unit 55 causes the index management unit 54 to add the path (path character string) representing the structure of the extracted node and the node ID of the node to the structure index table 59 (step S23). In contrast, if the path representing the structure of the extracted node has been stored (step S22), the document storage processing unit 55 causes the node ID of the node to correspond to the stored path and makes the index management unit 54 add the resulting set to the structure index table 59 (step S24).

After executing step S23 or S24, the document storage processing unit 55 carries out a document storage operation of storing the extracted node (i.e., a part of the XML document) in the database 42 (step S25).

After performing the document storage operation, the document storage processing unit 55 determines whether the parsing of the XML document requested by the client 20 is complete (step S26). That is, the document storage processing unit 55 determines whether all of the nodes included in the requested XML document have been processed. If there are unprocessed nodes left, the document storage processing unit 55 returns to step S14 and resumes the process for the next node.

By the above processes, the value index assigned to the node whose structure stored in the indexing table 57 is added to the value index table 58. The value index differs from a conventional value index in that it includes not only the value of a node (element) and the node ID of the node but also the node ID (related node ID) of the related node (parent node in this case). The value index table 58 of FIG. 5 includes the value indexes added when XML document 101 to XML document 103 of FIG. 2 were added to the database 42.

<Search Process>

Figure 9A:
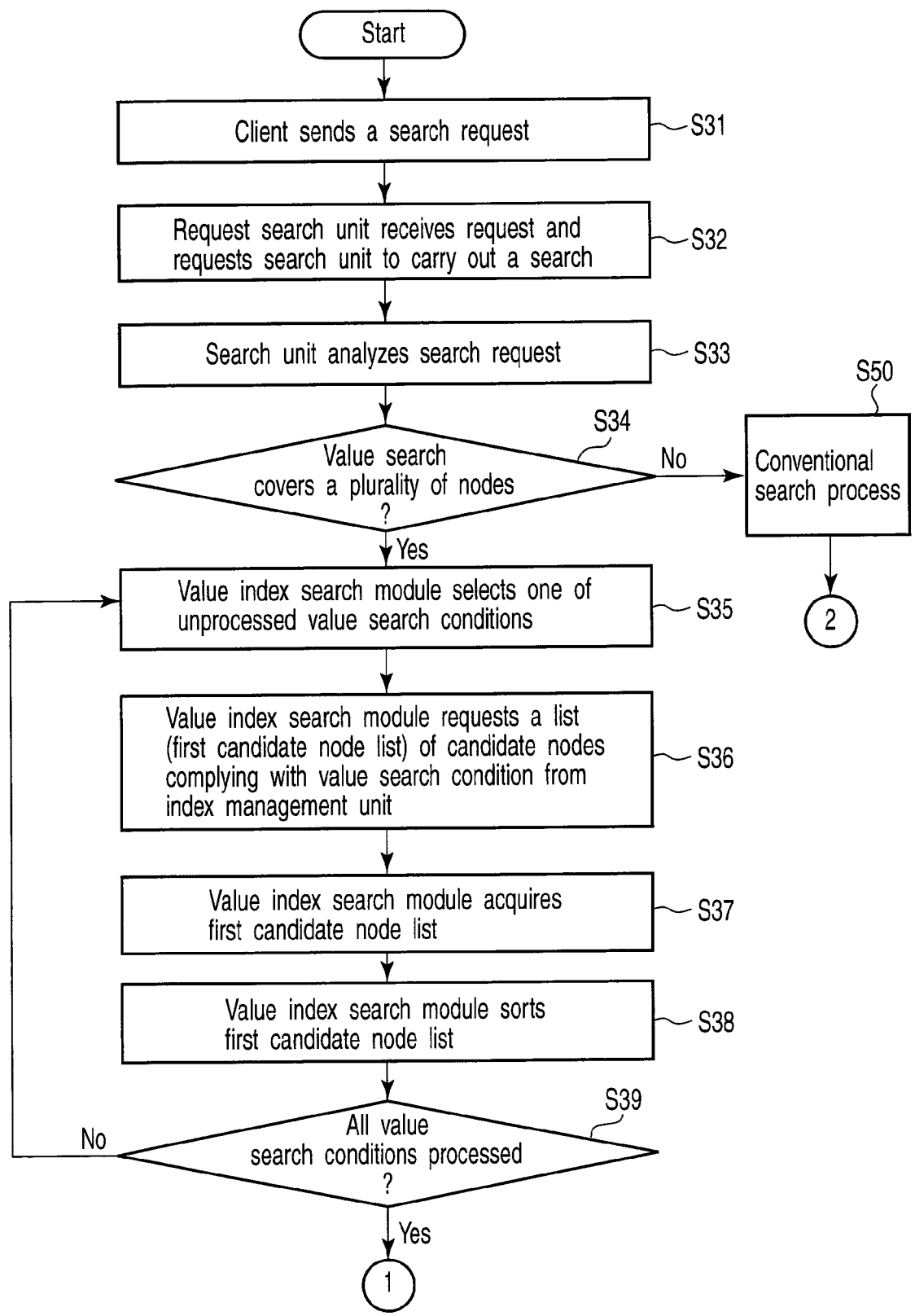
FIGS. 9A and 9B are flowcharts to help explain the procedure for a search process in the embodiment.
Figure 9B:
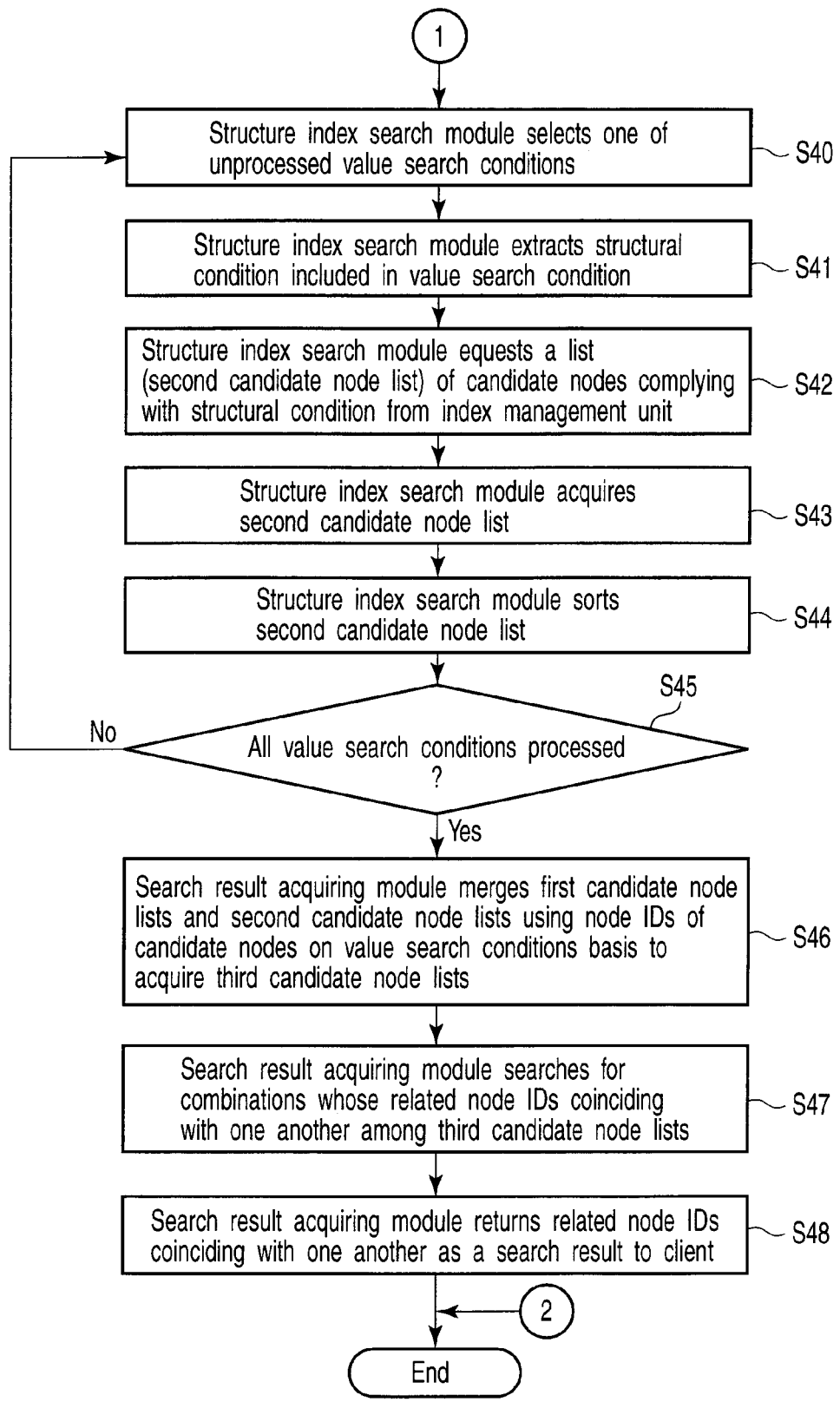

Next, a search process using value indexes stored in the value index table 58 and structure indexes stored in the structure index table 59 will be explained with reference to flowcharts in FIGS. 9A and 9B. Suppose, as a result of the user operating the client 20, the client 20 has sent a search request to the structured document search system 50 via the network 30 (step S31). The search request is assumed to include a query written in, for example, XPath. At this time, suppose the XML documents 101 to 103 having the structure of FIG. 2 have been stored in the database 42. Moreover, suppose the value index table 58 of FIG. 5 includes the value indexes added when the XML documents 101 to 103 of FIG. 2 were stored in the database 42.

Receiving the search request from the client 20, the request processing unit 52 hands the search request to the search unit 53, thereby requesting the search unit 53 to carry out a search (step S32). Receiving the search request from the client 20 via the request processing unit 52, the search unit 53 analyzes the search request (step S33). Here, suppose the query included in the search request is a second query written in the caption BACKGROUND OF THE INVENTION (xPath):

/bib/book/author[last="Stevens" and first="W."]

That is, suppose the client 20 has made a search request to search for an author (parent node) who satisfies the condition that last="Stevens" and first="W.". Here, the condition that last="Stevens", that is, the condition that the last node whose value is "Stevens", is one condition in the value search. Similarly, the condition first="W.", that is, the condition that the first node whose value is "W.", is one condition in the value search.

On the basis of the result of the analysis in step S23, the search unit 53 determines whether the requested search is a value search that covers the values of a plurality of nodes to which indexes have been set and the requested search target nodes are parent nodes (step S34). In the embodiment, the determination condition in step S34 is met. In this case, using the value index table 58, the value index search module 531 of the search unit 53 carries out a search as follows.

The value index search module 531 selects one unprocessed condition from a plurality of value search conditions (step S35). Here, suppose last="Stevens" has been selected. The value index search module 531 requests a list of value indexes for nodes (last nodes whose value is "Stevens") complying with the selected value search condition from the index management unit 54 (step S36). In the explanation below, a node complying with the selected value search condition is referred to as a candidate node.

Referring to the value index table 58 according to the request from the value index search module 531, the index management unit 54 generates a list of value indexes for the requested candidate nodes (last nodes whose value is "Stevens") as a first candidate node list. The first candidate node list includes the value of a candidate node and a set of the node IDs of all the nodes having the value and the node IDs (related node IDs) of the related nodes (parent nodes) of the nodes on a candidate node basis. Each set of a node ID and a related node ID may be assigned the value of the node ("Stevens" in this case). That is, the first candidate node list may be a list of sets of a value, a node ID and a related node ID.

The index management unit 54 informs the value index search module 531 of the search unit 53 of the first candidate node list generated on the basis of the value index table 58. As a result, the value index search module 531 acquires the informed first candidate node list (step S37). That is, the value index search module 531 acquires the first candidate node list by searching the value index table 58 for the value indexes complying with the value search condition via the index management unit 54.

After acquiring the first candidate node list, the value index search module 531 functions as a sort unit and sorts the first candidate node list in ascending order of, for example, the node IDs of candidate nodes and related node IDs (parent node IDs) (step S38). Here, the node IDs of candidate nodes are given priority. The sorted first candidate node list is stored in a specific area of the memory 11 included in the database server 10 of FIG. 1.

After executing step S38, the value index search module 531 determines whether all of the value search conditions have been processed (step S39). If there is any unprocessed value search condition left, the value index search module 531 returns to step S35 and selects one of the unprocessed conditions. Here, suppose the value search condition that first="W." has been selected.

The value index search module 531 carries out the processes in step S36 and forward for candidate nodes (first nodes whose value is "W.") complying with the selected value search condition. As a result, the value index search module 531 acquires a list of value indexes (index information) of candidate nodes (first nodes whose value is "W.") as a first candidate node list and sorts the list. The sorted first candidate node list is stored in a specific area of the memory 11 of FIG. 1.

FIGS. 10A and 10B show examples of a first candidate node list 111 of last nodes whose value is "Stevens" and a first candidate node list 112 of first nodes whose value is "W." acquired in the case of the value index table 58 of FIG. 5, respectively. FIG. 11 shows the positions in the XML documents 101 to 103 of FIG. 2 of the last nodes whose value is "Stevens" and the first nodes whose value is "W." included in the candidate lists 111 and 112 shown in FIGS. 10A and 10B. In FIG. 11, each of the outline arrows indicates a related node (parent node) of the last node whose value is "Stevens" or a related node (parent node) of the first node whose value is "W.".

Suppose the value index search module 531 of the search unit 53 has processed all of the plurality of nodes in the value search conditions (step S39). Then, the structure index search module 532 of the search unit 53 is started up. The structure index search module 532 selects one unprocessed condition from the plurality of value search conditions (step S40) and extracts the structural condition included in the selected condition (step S41). Here, (a path representing) the structural condition "/bib/book/author/last" for the node specified in the value search condition of last node whose value is "Stevens" has been extracted. The structure index search module 532 requests a list of structure indexes for nodes (candidate nodes) complying with the extracted structural condition (/bib/book/author/last) from the index management unit 54 (step S42).

The index management unit 54 refers to the structure index table 59 according to the request from the structure index search module 532, thereby generating a list of structure indexes of candidate nodes complying with the requested (selected) structural condition (/bib/book/author/last) as a second candidate node list. The second candidate node list includes a path (path character string) conforming to the structural condition and the node IDs of all the nodes (candidate nodes) specified by the path. Each node ID may be assigned a path ("/bib/book/author/last") representing the selected structural condition. That is, the second candidate node list may be a list of sets of a path and a node ID.

The index management unit 54 informs the structure index search module 532 of the search unit 53 of the generated second candidate node list. As a result, the structure index search module 532 acquires the informed second candidate node list (step S43). That is, the structure index search module 532 searches the structure index table 59 for a structure index complying with the structural condition included in the value search condition via the index management unit 54, thereby acquiring the second candidate node list.

After acquiring the second candidate node list, the structure index search module 532 functions as a sort unit and sorts the second candidate node list in ascending order of, for example, the node IDs of candidate nodes (step S44). The sorted second candidate node list is stored in a specific area of the memory 11 included in the database server 10 of FIG. 1.

After executing step S44, the structure index search module 532 determines whether all of the value search conditions have been processed (step S45). If there is any unprocessed value search condition left, the structure index search module 532 returns to step S40, selects one of the unprocessed conditions, and extracts the structural condition included in the selected condition (step S41). In this case, suppose (a path representing) the structured condition "/bib/book/author/first" for first node whose value is "W." has been extracted.

The structure index search module 532 carries out the processes in step S42 and forward for the extracted structural condition "bib/book/author/first". As a result, the structure index search module 532 acquires a list of structure indexes for candidate nodes complying with the structural condition "/bib/book/author/first" as a second candidate node list and sorts the list. The sorted second candidate node list is stored in a specific area of the memory 11 of FIG. 1.

FIGS. 12A and 12B show examples of a second candidate node list 113 of last nodes complying with the structural condition "/bib/book/author/last" and a second candidate node list 114 of first nodes complying with the structural condition "/bib/book/author/first" acquired in the case of the structure index table 59 of FIG. 6, respectively.

Suppose the structure index search module 532 of the search unit 53 has processed all of the plurality of nodes in the value search conditions (step S45). Then, the search result acquiring module 533 of the search unit 53 is started up. Using the node IDs of the candidate nodes, the search result acquiring module 533 merges the first candidate node list acquired on the basis of the value index table 58 and the second candidate node list acquired on the basis of the structure index table 59 for the condition on a value search condition basis (step S46). Here, the search result acquiring module 533 performs AND operation on the first and second candidate lists using the node IDs of candidate nodes as keys, thereby merging the first and second candidate lists. Such an AND operation is termed an AND merge operation.

As a result, third candidate node lists 115 and 116 shown in FIGS. 13A and 13B are generated according to the value search conditions (last="Stevens" and first="W."). The third candidate node list 115 is the result of the AND merge operation performed on the first candidate node list 111 of FIG. 10A and the second candidate node list 113 of FIG. 12A. For all of the node IDs (candidate node IDs) included in both of the lists 111 and 113, the third candidate node list 115 includes not only sets of the node ID and related node ID but also the value common to the nodes (elements) with the node IDs. The third candidate node list 116 is the result of the AND merge operation performed on the first candidate node list 112 of FIG. 10B and the second candidate node list 114 of FIG. 12B. The third candidate node list 116 includes not only sets of the node ID and related node ID for the node IDs included in both of the lists 112 and 114 but also the value common to the nodes (elements) with the node ID.

After executing step S46, the search result acquiring module 533 searches for combinations whose related node IDs (parent node IDs in this case) coinciding one another among the third candidate node lists generated according to the value search conditions (step S47). Here, using the related node IDs included in the third candidate node lists corresponding to the value search conditions as keys, the search unit 53a performs an AND merge operation on the third candidate node lists, thereby searching for combinations whose related node IDs (parent node IDs) coincide with one another. FIG. 14 shows a list (search result list) 117 of combinations whose related node IDs (parent IDs) coincide with one another between the candidate node lists 115 and 116 shown in FIGS. 13A and 13B. Here, only the related nodes whose value is 15 coincide with one another between the candidate node lists 115 and 116. That is, only the related node whose value is 15 is common to the candidate node lists 115 and 116. As seen from FIG. 11, the related node ID whose value is 15 is the node ID of an author satisfying the condition that last="Stevens" and first="W." requested in the search request from the client 20.

The search result acquiring module 533 returns the related node IDs (i.e., the related node IDs coinciding with one another among the third candidate node lists generated according to the value search conditions) included in the search result list acquired in step S47 as the search result for the search request from the client 20 via the request processing unit 52 to the client 20 (step S48). When the search result list 117 of FIG. 14 has been acquired, the related node ID whose value is 15, that is, the node ID (=15) of an author satisfying the condition that last="Stevens" and first="W." is returned as the search result to the client 20.

As described above, in the embodiment, the node IDs (related node IDs) of related nodes (parent nodes) are included in the value indexes held in the value index table 58. Therefore, in the embodiment, a search process which is for a value search covering the values of a plurality of nodes and which is for a search of related nodes (parent nodes) common to the plurality of nodes can be performed only by an indexing operation referring to the value index table 58. That is, in the embodiment, the search process can be executed at high speed without searching all the XML documents in the database 42.

If a search does not comply with the condition that a value search covers the values of a plurality of nodes and the requested nodes to be searched for are related nodes (parent nodes) of the plurality of nodes (step S34), the search unit 53 carries out a conventional search process (step S50).

In the embodiment, a case where the type of the related node of nodes (last nodes and first nodes) managed in the indexing table 57 is a parent node is a precondition. However, the type of the related node of nodes (last nodes and first nodes) managed in the indexing table 57 may be a node other than a parent node. For example, when the title of a book by an author satisfying the condition that last="Stevens" and first="W." is wanted as the search result, the user specifies an elder brother node (i.e., uncle node) of a parent node as a related node in an indexing request, enabling information on the related node suitable for the search condition used by the user to be included in a value index held in the value index table 58. This makes it possible to carry out a search at high speed even if the search condition (search target node) changes.

[Modification]

Figure 15:
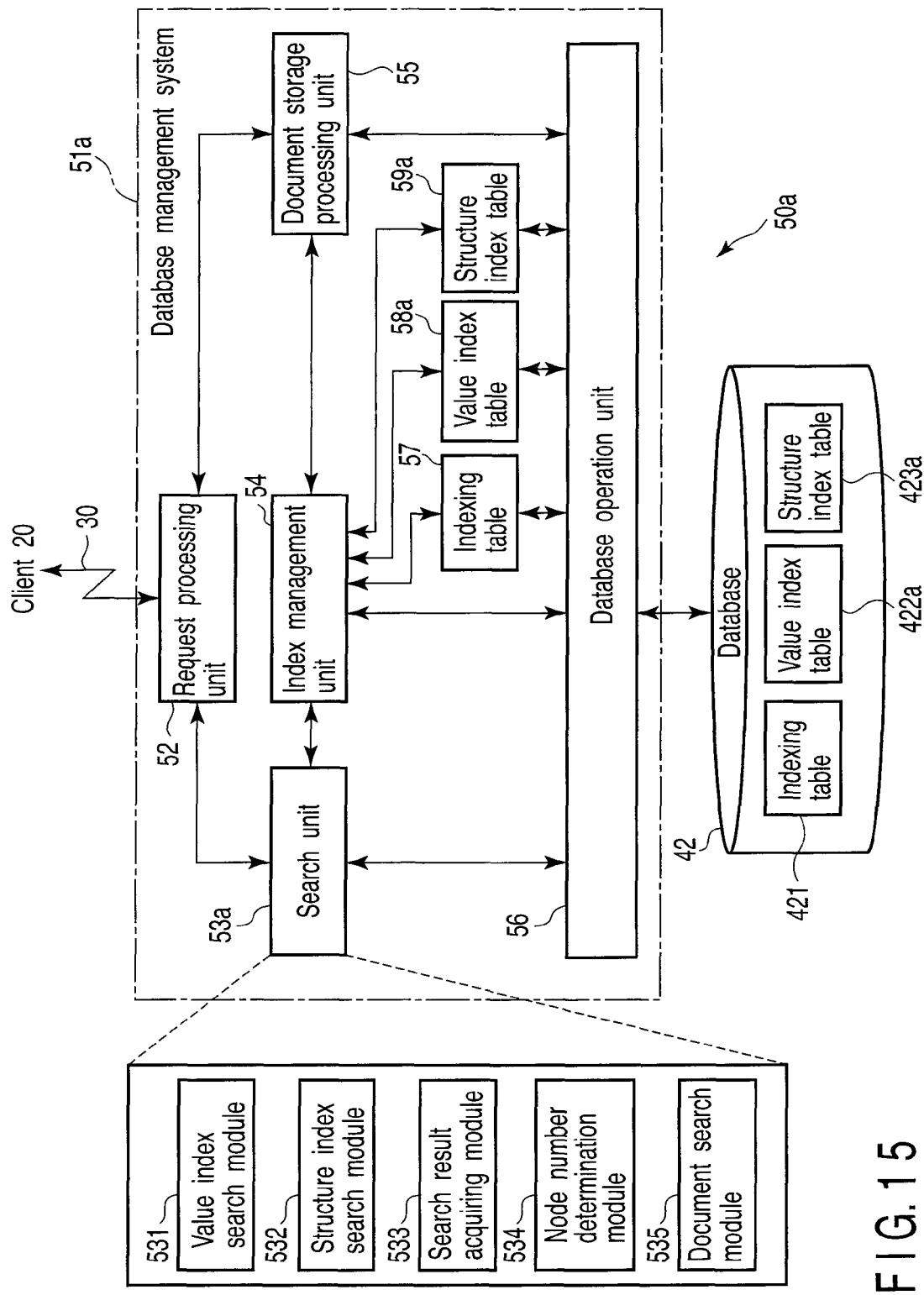
FIG. 15 is a block diagram mainly showing the functional configuration of a structured document search system applied to a modification of the embodiment.

Next, a modification of the embodiment (particularly, a modification of the structured document search system 50) will be explained with reference to the accompanying drawings. FIG. 15 is a block diagram mainly showing a functional configuration of a structured document search system 50a applied to the modification. In FIG. 15, the elements equivalent to those in FIG. 3 are indicated by the same reference characters.

The structured document search system 50a corresponds to the structured document search system 50 of the embodiment. Like the structured document search system 50, the structured document search system 50a is assumed to be realized by the database server 10 and external storage device 40 (database 42) shown in FIG. 1.

The structured document search system 50a comprises a database management system 51a and the database 42. In the modification, in the database 42, a set of XML documents, an indexing table 421, a value index table 422a, and a structure index table 423a have been stored.

The value index table 422a, which has the same data structure as a conventional value index table, has no related IDs differently from the value index table 422 applied in the embodiment. The structure index table 423a holds structure indexes caused to correspond (assigned) to the nodes (nodes regarded as possible targets of a value search) managed in the indexing table 421. As described in detail later, each of the structure indexes includes a set of a path (path character string) representing the structure of a node (element), the node ID of the node specified by the path, and the node ID of a related node (parent node in this case) related to the node.

The database management system 51a differs from the structured document search system 50 of FIG. 3 in that a search unit 53a, a value index table 58a, and a structure index table 59a are used in place of the search unit 53, value index table 58, and structure index table 59. The value index table 58a and structure index table 59a correspond to the value index table 422a and structure index table 423a stored in the database 42. The value index table 422a and structure index table 423a are copied as the value index table 58a and structure index table 59a to the memory 11 on starting up the structured document search system 50a.

The search unit 53a differs from the search unit 53 of the embodiment in that it includes not only the value index search module 531, structure index search module 532, and search result acquiring module 533 but also a node number determination module 534 and a document search module 535. The node number determination module 534 determines whether the total number of candidate nodes included in the first candidate node list acquired by the value index search module 531 is greater than or equal to a predetermined specific number. If the total number of candidate nodes is smaller than the specific number, the document search module 535 searches the XML documents stored in the database 42. In the search, the document search module 535 acquires lists (fourth candidate node lists) of candidate nodes conforming to the structural condition and searches for combinations whose related IDs coincide with one another between the lists.

FIG. 16 shows an example of the data structure of the value index table 58a shown in FIG. 15. Like the value index table 58 of the embodiment, the value index table 58a holds value indexes assigned to the nodes managed using the indexing table 57. Here, the value indexes held in the value index table 53a differ from the value indexes held in the value index table 58 in that it has no related node ID. The value index table 58a of FIG. 16 includes the value indexes assigned to the last nodes and first nodes in the XML documents 101 to 103 of FIG. 2.

FIG. 17 shows an example of the data structure of the structure index table 59a shown in FIG. 15. Like the structure index table 59 of the embodiment, the structure index table 59a is used to hold structure indexes representing the structures of the nodes included in the XML documents stored in the database 42. Each of the structure indexes includes a path (path character string) representing the structure, the node ID of the node specified by the path, and the node ID (related node ID) of a related node related to the node. The structure index differs from a structure index held in the structure index table 59 in that the related node ID is added. That is, in the modification, the related node ID is given to a structure index, not to a value index. The structure index table 59a of FIG. 17 includes a structure index corresponding to the structure of each of the nodes in the XML documents 101 to 103 of FIG. 2.

Next, the operation of the structured document search system 50a of FIG. 11 will be explained, centering on the difference from the structured document search system 50 of the embodiment.

<Document Storage Process>

Figure 18:
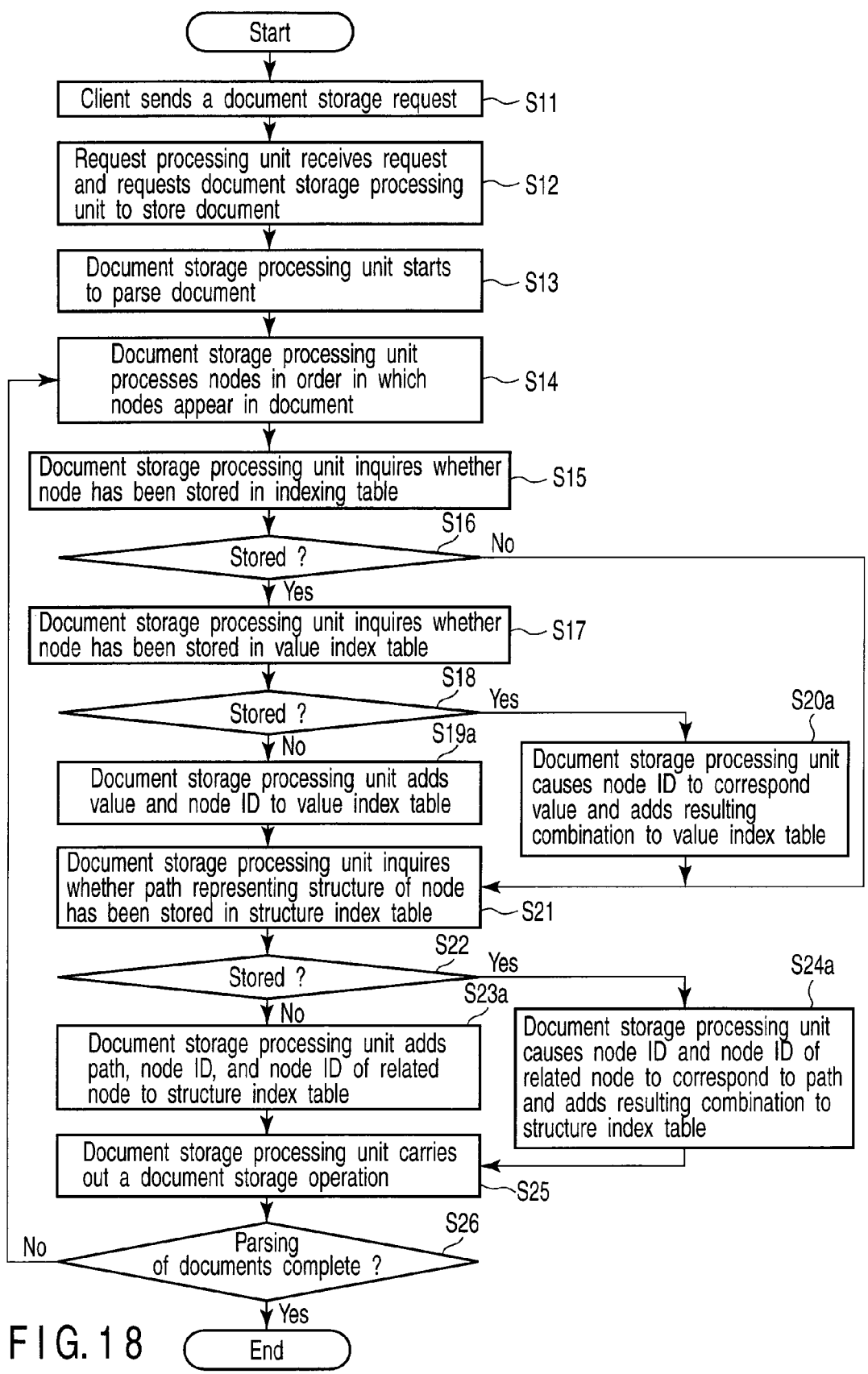
FIG. 18 is a flowchart to help explain the procedure for a document storage process in the modification.

First, a document storage process after the indexing in the modification will be explained with reference to a flowchart in FIG. 18. In FIG. 18, the processing steps equivalent to those in the flowchart of FIG. 8 are indicated by the same reference characters.

Suppose the client 20 sends to the structured document search system 50a a document storage request to store a user-specified XML document in the database 42 (step S11). Then, the document storage processing unit 55 of the structured document search system 50a starts to parse a specified XML document (step S13). Then, each time a node is extracted from the specified XML document, the document storage processing unit 55 processes the node as follows (step S14).

First, the document storage processing unit 55 inquires of the index management unit 54 whether information (a path) about the extracted node has been entered in the indexing table 57 (step S15). If it has been entered (step S16), the document storage processing unit 55, on the basis of the notice from the index management unit 54 in response to the inquiry, checks the type of the related node indicated by the related node type information stored in the indexing table 57 so as to correspond to the path representing the structure of the extracted node.

If information (the path) about the extracted node has been stored in the indexing table 57 (step S16), the document storage processing unit 55 inquires of the index management unit 54 whether the value of the node has been stored in the value index table 58*a* (step S17). If the value has not been stored (step S18), the document storage processing unit 55 causes the index management unit 54 to add the value of the extracted node and the node ID of the node to the value index table 58*a* (step S19*a*). In contrast, if the value of the extracted node has been stored (step S18), the document storage processing unit 55 causes the node ID of the node to correspond to the stored value and causes the index management unit 54 to add the result to the value index table 58*a* (step S20*a*).

After executing step S19*a* or S20*a*, the document storage processing unit 55 inquires of the index management section 54 whether the path (path character string) representing the structure of the extracted node has been stored in the structure index table 59*a* (step S21). If it has been determined that information on the nodes extracted in step S14 has not been stored in the indexing table 57 (step S16), the document storage processing unit 55 executes steps S21 and S22 immediately.

If the path representing the structure of the extracted node has not been stored (step S22), the document storage processing unit 55 causes the index management unit 54 to add the path (path character string), the node ID of the node and the node ID of the related node of the determined type to the structure index table 59 (step S23). In contrast, if the path representing the structure of the extracted node has been stored (step S22), the document storage processing unit 55 causes the node ID of the node and the node ID of the related node of the determined type to correspond to the path and makes the index management unit 54 add the resulting combination to the structure index table 59 (step S24*a*). In a structure index for the structure of a node not stored in the indexing table 57 (that is, a structure index for the structure of a node for which the type of the related node has not been determined), the node ID of the related node is not included.

After executing step S23*a* or S24*a*, the document storage processing unit 55 performs a document storage operation of storing the extracted node (i.e., a part of the XML document) in the database 42 (step S25). The document storage processing unit 55 repeats the above operations until the parsing of the XML document requested by the client 20 is complete.

<Search Process>

Figure 19A:
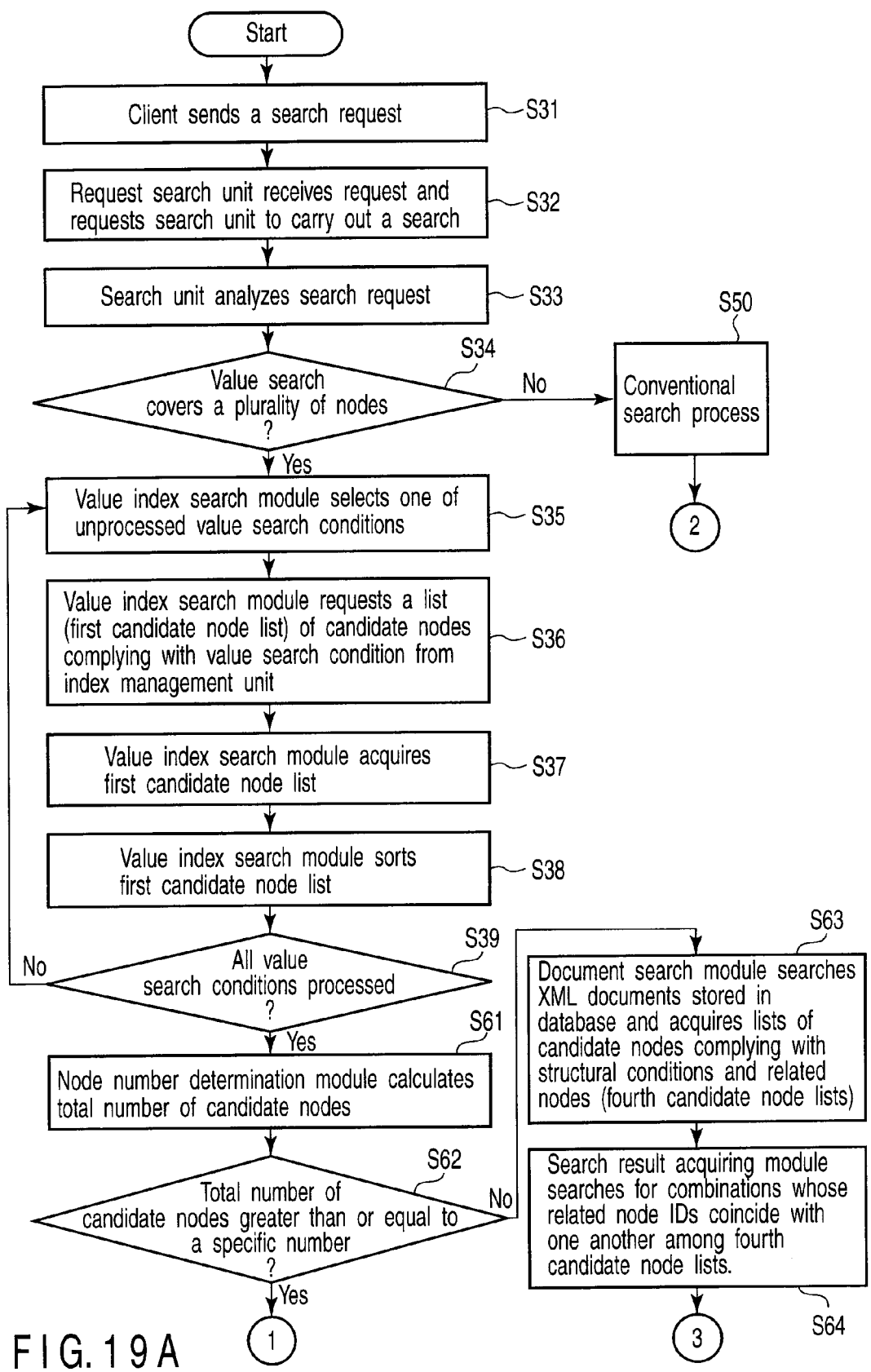
FIGS. 19A and 19B are flowcharts to help explain the procedure for a search process in the modification.
Figure 19:
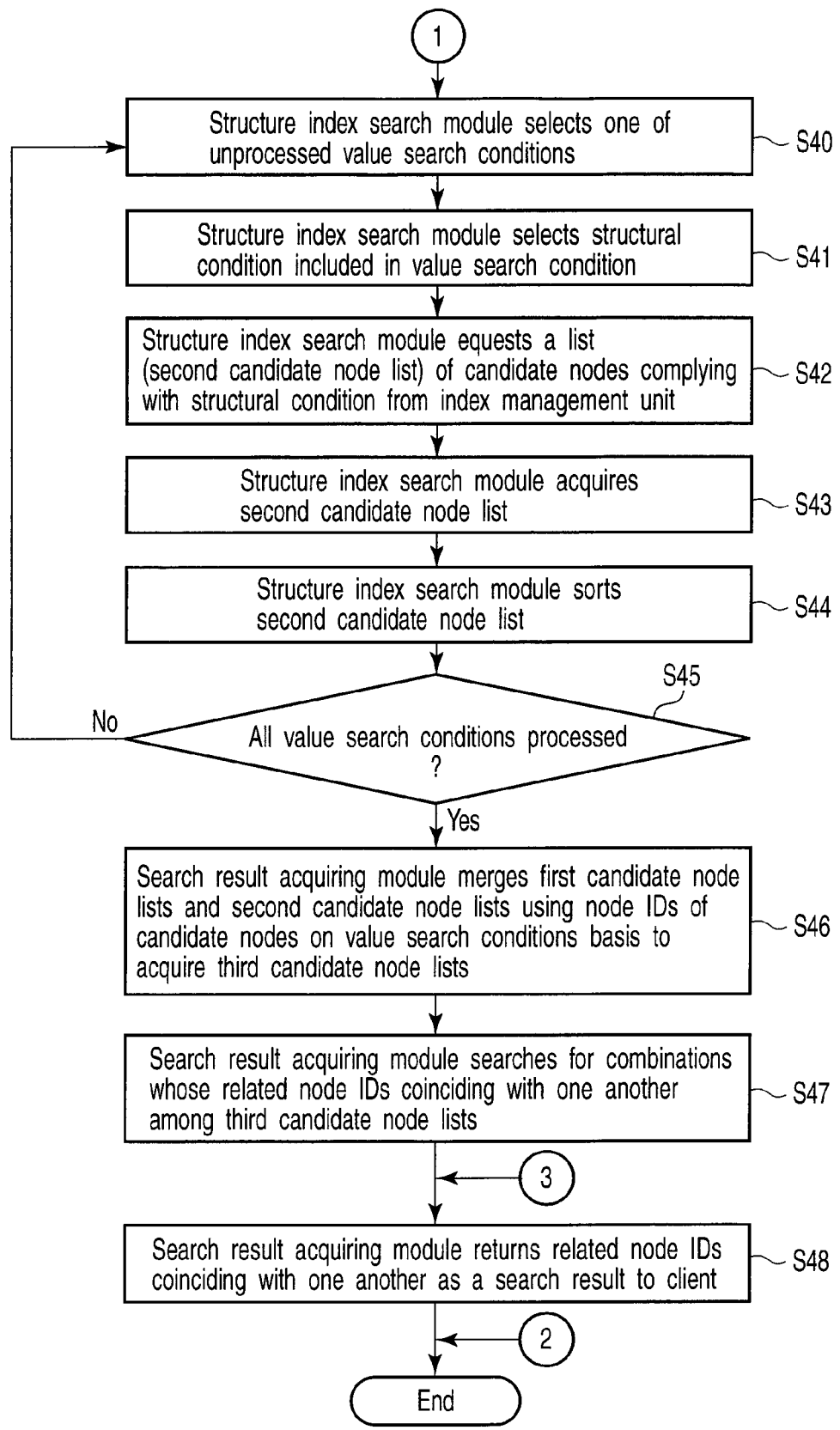

Next, a search process using value indexes stored in the value index table 58*a* and structure indexes stored in the structure index table 59*a* will be explained with reference to flowcharts in FIGS. 19A and 19B. In FIGS. 19A and 19B, the processing steps equivalent to those in the flowcharts of FIGS. 9A and 9B are indicated by the same reference characters.

Suppose the client 20 sends a search request including a query written in, for example, XPath to the structured document search system 50*a* (step S31). The query is assumed to be the second query (XPath). As described above, the second query includes the value search condition that last="Stevens" and the value search condition that first="W.". Moreover, these value search conditions include the structural condition that a node has a structure represented by "/bib/book/author/last" for a last node whose value is "Stevens" and the structural condition that a node has a structure represented by "/bib/book/author/first" for a first node whose value is "W.".

In this case, like the structured document search system 50 of the embodiment, the structured document search system 50*a* executes step S32 to step S39. Specifically, the value index search module 531 of the search unit 53*a* included in the structured document search system 50*a* acquires a list (a first candidate node list) of nodes complying with each of a plurality of value search conditions from the index management unit 54 and sorts the list. In the modification, however, the first candidate node list is generated using the value index table 58*a* and the list is sorted in ascending order of the ID nodes of candidate nodes.

FIGS. 20A and 20B show examples of a first candidate node list 111*a* of last nodes whose value is "Stevens" and a first candidate node list 112*a* of first nodes whose value is "W." acquired in the case of the value index table 58*a* of FIG. 16, respectively. The candidate node lists 111*a* and 112*a* include no related node ID differently from the candidate node lists 111 and 112 shown in FIGS. 10A and 10B.

When a first candidate node list has been acquired for each of a plurality of value search conditions (step S39), the node number determination module 534 of the search unit 53*a* is started up. The node number determination module 534 calculates the total number of node IDs of candidate nodes included in all the first candidate node lists after sorting, that is, the total number of candidate nodes (step S61). Then, the node number determination module 534 determines whether the total number of candidate nodes is greater than or equal to a predetermined specific number (step S62).

Here, suppose the total number of candidate nodes is greater than or equal to the specific number (step S62). In such a case, the structure index search module 532 of the search module 53*a* executes step S40 to step S45 as in the embodiment. Specifically, the structure index search module 532 carries out the process of acquiring a list (second candidate node list) of nodes complying with the structural condition for each of the structural conditions included in the plurality of value search conditions on the basis of the structure index table 59*a*. As a result, the structure index search module 532 acquires the second candidate node lists 113*a* and 114*a* as shown in FIGS. 21A and 21B.

The candidate node list 113*a* is a list of structure indexes for nodes (candidate nodes) complying with (the path representing) the structural condition "/bib/book/author/last" for nodes specified by the value search condition that the node is a last node whose value is "Stevens". The candidate node list 114*a* is a list of structure indexes for nodes (candidate nodes) complying with (the path representing) the structural condition "/bib/book/author/first" for nodes specified by the value search condition that the node is a first node whose value is "W.". Because of the characteristic of the structure index table 59*a* used in generating the candidate lists 113*a* and 114*a*, the lists 113*a* and 114*a* include related node IDs differently from the candidate node lists 113 and 114.

When the second candidate node list has been acquired for each of the structural conditions included in the plurality of value search conditions (step S45), the search result acquiring module 533 of the search unit 53 is started up. Using the node IDs of candidate nodes, the search result acquiring module 533 performs an AND merge operation on the first candidate node list acquired on the basis of the value index table 58*a* and the second candidate node list acquired on the basis of the structure index table 59*a* on a value search condition basis (step S46).

Here, an AND merge operation is performed on the first candidate node list 111*a* of FIG. 20A and the second candidate node list 113*a* of FIG. 21A, thereby generating a third candidate node list 115 shown in FIG. 13A as in the embodiment. Similarly, an AND merge operation is performed on the first candidate node list 112*a* of FIG. 20B and the second candidate node list 114*a* of FIG. 21B, thereby generating a third candidate node list 116 shown in FIG. 13B as in the embodiment.

After executing step S46, the search result acquiring module 533 searches for combinations whose related node IDs coinciding with one another among the third candidate node lists generated according to the value search conditions (step S47). Then, the search unit 53 returns the related node IDs coinciding with one another as the search result for the search request from the client 20 via the request processing unit 52 to the client 20 (step S48).

As described above, in the modification, the node IDs (related node IDs) of related nodes (parent nodes) are included in the structure indexes held in the structure index table 59*a*. Accordingly, in the modification, a search process which is for a value search covering the values of a plurality of nodes complying with the structure condition and which is for a search of related nodes (parent nodes) common to the plurality of nodes can be performed only by an indexing operation referring to the value index table 58*a* and structure index table 59*a*. That is, in the modification, the search process can be executed at high speed without searching all the XML documents in the database 42 as in the embodiment. This effect becomes more noticeable as the number of nodes complying with each of the value search conditions increases.

Conversely, if the total number of nodes complying with each of the value search conditions found on the basis of the value index table 58*a* is small, use of a search method similar to conventional techniques, that is, a method of actually searching the XML documents stored in the database 42, might enable a search to be made at higher speed. Therefore, in the modification, if it has been determined in step S62 that the total number of candidate nodes (i.e., the total number of nodes complying with each of the value search conditions) is smaller than the specific number, the search unit 53*a* searches for the requested nodes (related nodes) to be searched for by a search method similar to conventional techniques as described below.

First, the document search module 535 of the search unit 53*a* searches the XML documents stored in the database 42 for the nodes included in the candidate node list acquired for each of the value search conditions (step S63). In step S63, for each structural condition corresponding to the value search condition, the document search module 535 extracts the node IDs of nodes complying with the structural condition and the node IDs (related node IDs) of related nodes (parent nodes) of the nodes (nodes complying with the structural condition) from the searched XML document. In step S63, the document search module 535 acquires a list of the node IDs of the extracted nodes and the node IDs (related node IDs) of the related nodes as a fourth candidate node list. That is, the document search module 535 acquires the fourth candidate node lists according to the structural conditions.

Then, the search result acquiring module 533 of the search unit 53*a* searches for combinations whose related node IDs coincide with one another among all the fourth candidate node lists acquired according to the structural conditions (step S64). Then, the search result acquiring module 533 returns a related node ID common to the found combinations as the search result for the search request from the client 20 via the request processing unit 52 to the client 20 (step S48). As described above, in the modification, since the best search procedure is applied automatically according to the total number of candidate nodes, the optimum processing capability can be realized.

As in the embodiment, in the modification, a case where the type of the related node of nodes (last nodes and first nodes) managed in the indexing table 57 is a parent node is a precondition. However, the type of the related node of nodes (last nodes and first nodes) managed in the indexing table 57 may be a node other than a parent node. For example, when the title of a book by an author satisfying the condition that last="Stevens" and first="W." is wanted as the search result, the user specifies an uncle node as a related node in an indexing request, enabling information on the related node suitable for the search condition used by the user to be included in the structure index table 59*a*. This makes it possible to carry out a search at high speed even if the search condition (search target nodes) changes.

The search unit 53*a* itself may refer to the indexing table 57, value index table 58*a*, and structure index table 59*a*. Similarly, in the embodiment, the search unit 53 itself may refer to the indexing table 57, value index table 58, and structure index table 59. Furthermore, as in the modification, in the embodiment, the search unit 53 may be provided with the node number determination module 534 and document search module 535.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A structured document search system comprising:
    an index storage unit which stores indexes associated with first nodes included in structured documents stored in a database, the indexes including node information items about the first nodes and second position information items about second nodes, the node information items including first position information items about the first nodes and values of the first nodes, the second nodes being related nodes, and the related nodes being nodes of a predetermined type having a specific relation to the first nodes on a tree structure of the structured documents including the first nodes; and
    a search unit which is configured to search on the basis of a search condition specified in a search request from a client, the search unit being configured, when the search condition includes value search conditions for a search of values of a plurality of nodes and is a specific search condition specifying a search of a specific related node included in related nodes of said plurality of nodes, to search the index storage unit for indexes of nodes which have values complying with values included in the value search conditions and being also configured to acquire, as a position information item about the specific related node complying with the specific search condition, a same position information item from the second position information items included in the indexes searched for, wherein:

the indexes associated with the first nodes include value indexes and structure indexes, the value indexes including the node information items about the first nodes and the second position information items about the second nodes, and the structure indexes including structure information items indicating the structures of the first nodes with which the structure indexes are associated and the first position information items about the first nodes;

the value search conditions include structural conditions;

the index storage unit comprises a value index storage unit which stores the value indexes and a structure index storage unit which stores the structure indexes; and the search unit includes:

a value index search module which is configured to search the value index storage unit for the value indexes of nodes whose values comply with the values included in the value search conditions as the value indexes of first candidate nodes when the search condition specified in the search request is the specific search condition, the value index search module being configured to acquire first candidate node lists corresponding to the value search conditions on the basis of the value indexes searched for, the first candidate node lists being lists of the first candidate nodes and related nodes having the specific relation to the first candidate nodes, and the first candidate node lists including position information items of the first candidate nodes and position information items of the related nodes of the first candidate nodes;

a structure index search module which is configured to search the structure index storage unit for the structure indexes of nodes whose structures comply with the structural conditions included in the value search conditions as the structure indexes of second candidate nodes, the structure index search module being configured to acquire second candidate node lists corresponding to the value search conditions on the basis of the structure indexes searched for, and the second candidate node lists being lists of the second candidate nodes and including position information items of the second candidate nodes; and a search result acquiring module which is configured to acquire, as third candidate nodes, candidate nodes included in both the first candidate node lists and the second candidate node lists acquired according to the value search conditions, the search result acquiring module being configured to acquire, from the third candidate nodes, a combination of candidate nodes whose related nodes coincide with one another and being configured to acquire, as the position information item of the specific related node, a position information item of a related node corresponding to the combination.

2. The structured document search system according to claim 1, further comprising:

an indexing information storage unit which stores first indexing information items, the first indexing information items indicating structures of third nodes with which indexes are to be associated and types of related nodes having a specific relation to the third nodes on a tree structure of structured documents including the third nodes;

an index management unit which is configured to add, as one of the first indexing information items, a second indexing information item specified in an indexing request to specify indexing from the client to the indexing information storage unit in accordance with the indexing request, the indexing request including information to specify, as one of the third nodes, a node with which an index is to be associated and information to specify the type of a related node having the specific relation to the specified node on a structured document including the specified node, and the second indexing information item indicating the structure of the specified node and the type of the related node specified in the indexing request; and a document storage processing unit which is configured to store, in accordance with a document storage request from the client, a structured document specified in the document storage request in the database, wherein the index management unit, when indexing information items about fourth nodes included in the specified structured document have already been stored in the indexing information storage unit as the first indexing information items about the third nodes, adds indexes associated with the fourth nodes to the index storage unit as the indexes associated with the first nodes, the types of the related nodes of the fourth nodes being indicated by the indexing information items about the fourth nodes.

3. The structured document search system according to claim 1, wherein the search result acquiring module is configured to acquire third candidate node lists by merging the first candidate node lists and the second candidate node lists in terms of the third candidate nodes and is further configured to acquire the combination from the third candidate node lists.

4. The structured document search system according to claim 3, wherein the search result acquiring module is configured to perform an AND merge operation on the first candidate node lists and the second candidate node lists using position information items about the first candidate nodes and position information items about the second candidate nodes as keys and is also configured to merge the first candidate node lists and the second candidate node lists by the AND merge operation.

5. The structured document search system according to claim 1, wherein:

the structure index search module is configured to operate, when the number of the first candidate nodes is greater than or equal to a predetermined specific number, to acquire the second candidate node list;

the search unit includes a structured document search module which is configured to operate when the number of the first candidate nodes is smaller than the specific number, the structured document search module being configured to search the structured documents stored in the database for the first candidate nodes and being further configured to acquire lists of fifth nodes whose structures comply with the structural conditions included in the value search conditions and related nodes of the fifth nodes as third candidate node lists; and the search result acquiring module is configured to acquire the combination from the third candidate node lists.

6. A method of searching for a structured document stored in a database using indexes in a database server computer which includes an index storage unit for storing indexes associated with first nodes included in structured documents stored in the database, the method comprising:

in accordance with a structured document storage request from a client, storing a structured document specified in the structured document storage request in the database;

when the specified structured document is stored in the database, adding indexes associated with first nodes included in the specified structured document to the index storage unit, the added indexes including node information items about the first nodes and second position information items about second nodes, the node information items including first position information items about the first nodes and values of the first nodes, the second nodes being related nodes, and the related nodes being nodes of a predetermined type having a specific relation to the first nodes on a tree structure of the structured documents including the first nodes;

searching the index storage unit for indexes on the basis of a search condition specified in a search request from the client, the indexes searched for being indexes of nodes which have values complying with values included in value search conditions for a search of values of a plurality of nodes when the search condition includes the value search conditions and is a specific search condition specifying a search of a specific related node included in related nodes of said plurality of nodes;

acquiring, as a position information item about the specific related node complying with the specific search condition, a same position information item from the second position information items included in the indexes searched for; and returning the acquired position information item about the specific related node to the client as a search result for the search request from the client wherein:

the indexes associated with the first nodes include value indexes and structure indexes, the value indexes including the node information items about the first nodes and the second position information items about the second nodes, and the structure indexes including structure information items indicating the structures of the first nodes with which the structure indexes are associated and the first position information items about the first nodes;

the value search conditions include structural conditions;

the index storage unit comprises a value index storage unit which stores the value indexes and a structure index storage unit which stores the structure indexes;

the searching the index storage unit for indexes includes:
when the search condition specified in the search request is the specific search condition, searching the value index storage unit for the value indexes of nodes whose values comply with the values included in the value search conditions as the value indexes of first candidate nodes; and searching the structure index storage unit for the structure indexes of nodes whose structures comply with the structural conditions included in the value search conditions as the structure indexes of second candidate nodes, and the acquiring a same position information item includes:
acquiring first candidate node lists corresponding to the value search conditions on the basis of the value indexes searched for, the first candidate node lists being lists of the first candidate nodes and related nodes of the first candidate nodes, and the first candidate node lists including position information items of the first candidate nodes and position information items of the related nodes of the first candidate nodes;

acquiring second candidate node lists corresponding to the value search conditions on the basis of the structure indexes searched for, the second candidate node lists being lists of the second candidate nodes and including position information items of the second candidate nodes;

acquiring, as third candidate nodes, candidate nodes included in both the first candidate node lists and the second candidate node lists;

acquiring, from the third candidate nodes, a combination of candidate nodes whose related nodes coincide with one another; and acquiring, as the position information item of the specific related node, a position information item of a related node corresponding to the combination.

7. A computer program product embodied on a computer-readable storage medium, the computer program product being used to search for a structured document stored in a database on a computer, the structured document being searched for using indexes, and the computer having an index storage unit for storing indexes associated with first nodes included in structured documents stored in the database, the computer program product implementing a method comprising:

in accordance with a structured document storage request from a client, causing the computer to store a structured document specified in the structured document storage request in the database;

when the specified structured document is stored in the database, causing the computer to add indexes associated with first nodes included in the specified structured document to the index storage unit, the added indexes including node information items about the first nodes and second position information items about second nodes, the node information items including first position information items about the first nodes and values of the first nodes, the second nodes being related nodes, and the related nodes being nodes of a predetermined type having a specific relation to the first nodes on a tree structure of the structured documents including the first nodes;

causing the computer to search the index storage unit for indexes on the basis of a search condition specified in a search request from the client, the indexes searched for being indexes of nodes which have values complying with values included in value search conditions for a search of values of a plurality of nodes when the search condition includes the value search conditions and is a specific search condition specifying a search of a specific related node included in related nodes of said plurality of nodes;

causing the computer to acquire, as a position information item about the specific related node complying with the specific search condition, a same position information item from the second position information items included in the indexes searched for; and causing the computer to return the acquired position information item about the specific related node to the client as a search result for the search request from the client wherein:

the indexes associated with the first nodes include value indexes and structure indexes, the value indexes including the node information items about the first nodes and the second position information items about the second nodes, and the structure indexes including structure information items indicating the structures of the first nodes with which the structure indexes are associated and the first position information items about the first nodes;

the value search conditions include structural conditions;

the index storage unit comprises a value index storage unit which stores the value indexes and a structure index storage unit which stores the structure indexes;

the searching the index storage unit for indexes includes:

when the search condition specified in the search request is the specific search condition, causing the computer to search the value index storage unit for the value indexes of nodes whose values comply with the values included in the value search conditions as the value indexes of first candidate nodes; and causing the computer to search the structure index storage unit for the structure indexes of nodes whose structures comply with the structural conditions included in the value search conditions as the structure indexes of second candidate nodes, and the acquiring a same position information includes:

causing the computer to acquire first candidate node lists corresponding to the value search conditions on the basis of the value indexes searched for, the first candidate node lists being lists of the first candidate nodes and related nodes of the first candidate nodes, and the first candidate node lists including position information items of the first candidate nodes and position information items of the related nodes of the first candidate nodes;

causing the computer to acquire second candidate node lists corresponding to the value search conditions on the basis of the structure indexes searched for, the second candidate node lists being lists of the second candidate nodes and including position information items of the second candidate nodes;

causing the computer to acquire, as third candidate nodes, candidate nodes included in both the first candidate node lists and the second candidate node lists;

causing the computer to acquire, from the third candidate nodes, a combination of candidate nodes whose related nodes coincide with one another; and causing the computer to acquire, as the position information item of the specific related node, a position information item of a related node corresponding to the combination.

* * * * *

UNITED STATES PATENT AND TRADEMARK OFFICE
CERTIFICATE OF CORRECTION

PATENT NO. : 7,917,500 B2  
APPLICATION NO. : 12/046029  
DATED : March 29, 2011  
INVENTOR(S) : Sakai et al.

Page 1 of 1

It is certified that error appears in the above-identified patent and that said Letters Patent is hereby corrected as shown below:

Claim 6, column 23, line 26, change "client" to --client,--.

Claim 7, column 24, line 53, change "client" to --client,--.

Signed and Sealed this
Fourteenth Day of June, 2011

David J. Kappos
*Director of the United States Patent and Trademark Office*